US012120116B2

(12) United States Patent
Sholtis et al.

(10) Patent No.: US 12,120,116 B2
(45) Date of Patent: *Oct. 15, 2024

(54) SYSTEM AND METHOD TO FACILITATE AN ACCOUNT PROTECTION CHECK FOR SETS OF CREDENTIALS

(71) Applicants: Steven Sholtis, Hampstead, NC (US); Bill Hudson, Hampstead, NC (US); David Hazar, Draper, UT (US)

(72) Inventors: Steven Sholtis, Hampstead, NC (US); Bill Hudson, Hampstead, NC (US); David Hazar, Draper, UT (US)

( * ) Notice: Subject to any disclaimer, the term of this patent is extended or adjusted under 35 U.S.C. 154(b) by 274 days.

This patent is subject to a terminal disclaimer.

(21) Appl. No.: 17/844,855

(22) Filed: Jun. 21, 2022

(65) Prior Publication Data

US 2022/0321562 A1 Oct. 6, 2022

Related U.S. Application Data

(63) Continuation-in-part of application No. 17/710,738, filed on Mar. 31, 2022, which is a
(Continued)

(51) Int. Cl.
*H04L 29/06* (2006.01)
*H04L 9/40* (2022.01)
(52) U.S. Cl.
CPC ...... *H04L 63/0884* (2013.01); *H04L 63/0853* (2013.01); *H04L 63/102* (2013.01)
(58) Field of Classification Search
CPC ....... G06F 21/31; G06F 21/45; H04L 63/083; H04L 63/10
See application file for complete search history.

(56) References Cited

U.S. PATENT DOCUMENTS 6,067,568 A * 5/2000 Li ................... H04L 41/0843
709/223
7,797,734 B2 * 9/2010 Babi .................... H04L 63/08
726/4
(Continued)

FOREIGN PATENT DOCUMENTS

WO WO2009007188 A1 1/2009

OTHER PUBLICATIONS

Google, Cancel, pause, or change a subscription on Google Play, Retrieved on Mar. 6, 2020 <URL: https://support.google.com/googleplay/answer/7018481?co=GENIE.Platform%3DAndroid&hl=en>.

*Primary Examiner* — Dao Q Ho

(57) ABSTRACT

A system and a method are provided for facilitating an account protection check for the security of sets of credentials. The system and method enable the use of an access control mechanism to regulate the changes to the lock status of the sets of credentials. A third-party server of a service provider requests a token from the system before the authentication process. The access control mechanism also approves or denies the request before the authentication process. If the credential set is in a locked status or unlocked status, at least one remote server of the system respectively relays an invalidation token or a validation token to the third-party server. If the invalidation token is relayed to the third-party server, the service provider does not go through the authentication process. If the validation token is relayed to the third-party server, the service provider proceeds with the authentication process as standard procedure.

22 Claims, 24 Drawing Sheets

Related U.S. Application Data continuation-in-part of application No. 17/207,411, filed on Mar. 19, 2021, now Pat. No. 11,615,180.

(60) Provisional application No. 62/991,990, filed on Mar. 19, 2020.

(56) References Cited

U.S. PATENT DOCUMENTS

| | | | |
|---|---|---|---|
| 2007/0101411 A1* | 5/2007 | Babi | H04L 63/18 726/4 |
| 2009/0019514 A1* | 1/2009 | Hazlewood | H04L 63/0281 726/1 |
| 2009/0276837 A1* | 11/2009 | Abzarian | G06F 21/31 726/5 |
| 2020/0213334 A1* | 7/2020 | Kutner | H04L 63/1416 |
| 2022/0172303 A1* | 6/2022 | Handy Bosma | H04W 4/023 |

* cited by examiner

SYSTEM AND METHOD TO FACILITATE AN ACCOUNT PROTECTION CHECK FOR SETS OF CREDENTIALS

The current application is a continuation-in-part (CIP) application of a U.S. non-provisional application Ser. No. 17/710,738 filed on Mar. 31, 2022. The U.S. non-provisional application Ser. No. 17/710,738 claims a priority to a U.S. non-provisional application Ser. No. 17/207,411 filed on Mar. 19, 2021. The U.S. non-provisional application Ser. No. 17/207,411 claims a priority to a U.S. provisional application Ser. No. 62/991,990 filed on Mar. 19, 2020.

FIELD OF THE INVENTION

The present invention relates generally to data processing and account security. More specifically, the present invention is systems and methods to facilitate the validation of sets of credentials using an access control mechanism to grant access to secure accounts.

BACKGROUND OF THE INVENTION

Username/Password credential validation methods are the most commonly used authentication methods on the Internet. Almost all online services, sites, applications, and processes rely on the validation of credentials prior to authorizing access to resources. The services, applications, and other interfaces rely on authentication prior to granting access; therefore, these systems keep tracking authentication requests continuously. This often leaves these systems open to receive requests for credential validation outside of predetermined parameters the actual owner of the credentials original intended. Further, with the rise in identity theft, single factor authorization is not enough to protect online accounts. Therefore, there is a need for improved systems and methods to facilitate the validation of sets of credentials that may overcome one or more of the above-mentioned problems and/or limitations.

The present invention provides a system and method for facilitating the validation of sets of credentials using an account protection check. The present invention allows a user to lock or unlock sets of credentials to control access to one or more accounts. Before a service provider goes through an authentication process, the service provider requests a token from the service provided by the present invention. In addition, the present invention includes an access control mechanism that requires users to perform a set of protocols before being granted access to the accounts. If the user fails to perform the set of protocols, the token is not relayed, denying the request by the user to access the accounts. The service provider also performs an automatic account protection check which analyses the validity of the request to ensure that the set of credentials has not been compromised. Based on if the credential set is in a locked or unlocked status, the present invention relays an invalidation token or a validation token to the service provider, respectively. If the invalidation token is relayed to the service provider, the service provider does not go through the authentication process. If the validation token is relayed to the service provider, the service provider proceeds with the authentication process. Additional features and benefits of the present invention are further discussed in the section below.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method for facilitating an account protection check for sets of credentials is disclosed. Accordingly, the method may include a step of receiving, using a communication device, a login request associated with at least one user from a resource owner. The method may include a step of analyzing, using a processing device, the login request. The login request may be analyzed utilizing user metadata to validate the authenticity of the login request. In addition, the present invention may include a step of employing an access control mechanism to approve the login request before proceeding with the validation process. Further, the method may include a step of retrieving, using a storage device, a preauthorized token from the resource owner, if the login request is approved by the access control mechanism. In addition, the method may include a step of validating, using the processing device, the credential set state associated with the at least one user. The method may also include a step of generating, using the processing device, a token response associated with the credential set state. Further, the method may include a step of transmitting, using the communication device, the token response to the resource owner.

The access control mechanism enables users to control the change of lock status of the set of credentials by implementing one or more predefined policies which require N steps to be completed prior to a status change. For example, users could design a policy enforcing that more than one user must approve the unlock request prior to an account being unlocked. In this case, a second user is required to approve the unlock request of an account prior to authentication occurring. Further, policies related to locking and unlocking can have any number of steps, can invoke actions like calling external systems, send notifications, request additional approvals via multiple communication channels like email, text messaging, voice, etc. The outcome of all these policies however is related to modifying the lock status associated with N accounts. Furthermore, policies can be designed in a series of N steps and/or processes which may be invoked both prior to and post status changes occurring.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

DETAIL DESCRIPTIONS OF THE INVENTION

All illustrations of the drawings are for the purpose of describing selected versions of the present invention and are not intended to limit the scope of the present invention.

Figure 1:
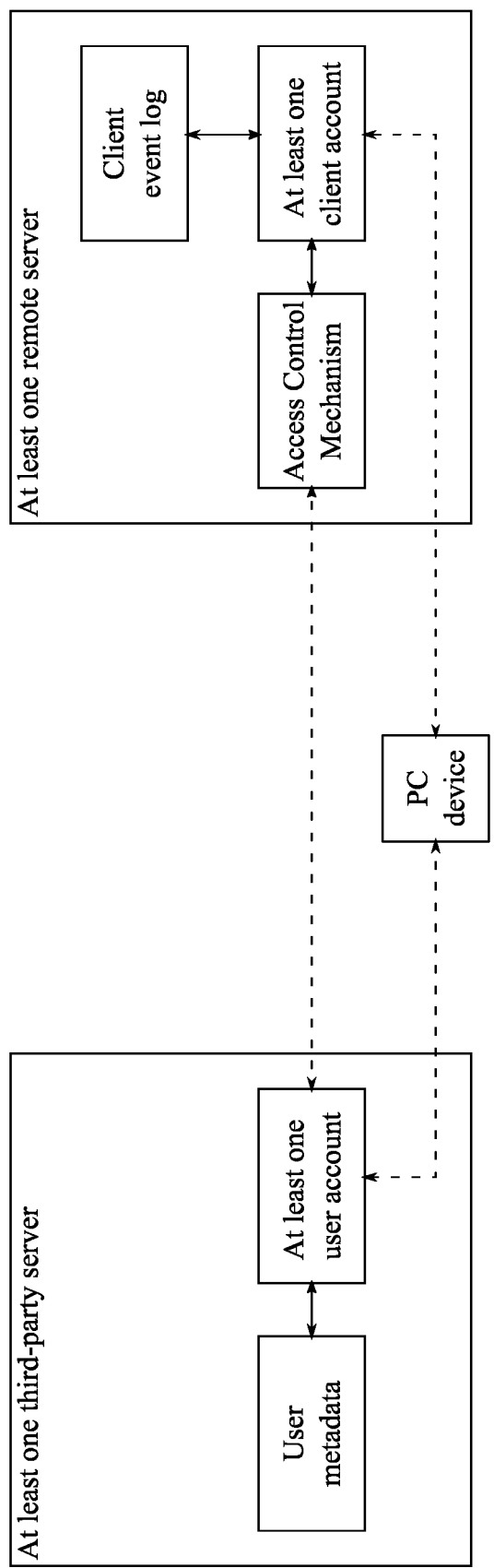
FIG. 1 is a block diagram for the system of the present invention.

In reference to FIG. 1, the present invention provides a system and method for facilitating an account protection check for sets of credentials. More specifically, the present invention implements an account protection check when the user desires to access one or more accounts that requires a set of policies to be performed in order for the user to access the accounts. The account protection check provides greater security to the accounts in addition to the set of credentials lock status. For example, the login request from a first user may be set to be simultaneously authorized by a second user, such as an administrator, before the first user can access the account. With reference to FIG. 1, the system of the present invention includes at least one remote server that manages at least one client account and at least one access control mechanism (Step A). The client account is associated with a corresponding personal computing (PC) device which can be, but not limited to, a desktop computer, a notebook computer, a smartphone, or a mobile tablet. The remote server is a computing node where information provided by the client account is processed and stored. The access control mechanism includes at least one security policy that must be performed by user and/or other users so that the user can access the client account.

Additionally, with reference to FIG. 1, the system of the present invention further includes at least one third-party server that manages at least one user account (Step B). The user account is associated with the corresponding PC device, and the user account includes a credential set. The credential set allows the user to access the user account and thus use the service provided by the third-party server. In more detail, the credential set can be a username and password that the user must enter correctly in order to access the user account. Moreover, the credential set can be associated with a credential token that allows the user to quickly access the user account with biometric or facial information. Alternatively, the credential can be associated with a credential key. For example, the credential token can be any type of credential token such as, but not limited to, a facial identification token or a touch identification token. The third-party server is a computing node that processes and stores information provided by the user account. Moreover, the third-party server is a computing node that is associated with a third-party service, which can be, but is not limited to, an email service, an electronic vehicle entry service, a building access service, a computer operating system, or an Internet of Things (IoT) network. Further, the user account is associated with the client account, and the credential set is either in an unlocked or a locked status. The user account and the client account are linked so that the user can access the resources associated with the client account. The unlocked status or the locked status can be toggled by the user, or the user can grant the service provider of the third-party server the ability to toggle the credential set between the unlocked or locked status for security purposes. Furthermore, the credential set is associated with the access control mechanism so that any change to the lock status of the credential set is regulated by the access control mechanism.

Figure 2:
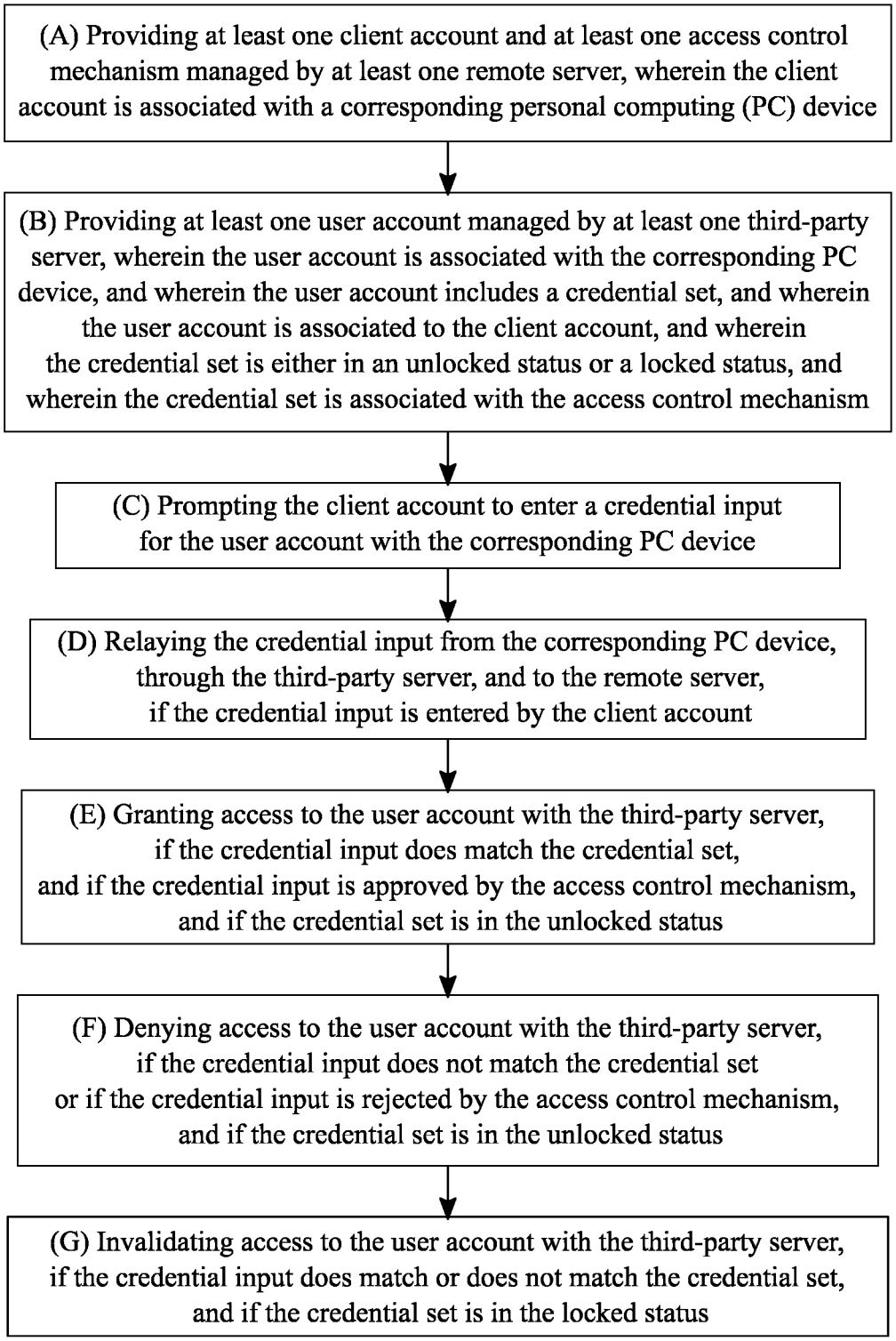
FIG. 2 is a flowchart illustrating the overall process for the method of the present invention.

With reference to FIG. 2, the method of the present invention follows an overall process for facilitating the security for sets of credentials. The overall process begins by prompting the client account to enter a credential input for the user account with the corresponding PC device (Step C).

More specifically, the client account is prompted to enter a username and password or to use a facial or biometric data in order to access the service provided by the third-party server. The credential input is relayed from the corresponding PC device, through the third-party server, and to the remote server, if the credential input is entered by the client account (Step D). In further detail, the credential input is received by the third-party server for an authentication process. However, before the credential input is authenticated, the credential input is sent to the remote server in order to check if the credential set is in the unlocked or locked status. The third-party server grants access to the user account, if the credential input does match the credential set, and if the credential input is approved by the access control mechanism, and if the credential set is in the unlocked status (Step E). In further detail, the remote server validates the credential set because the credential set is in the unlocked status, and the access control mechanism has processed and approved the credential input. Therefore, the third-party server can proceed with the authentication process. Further, the third-party server authenticates the credential input because the credential input matches the credential set, and, thus, the user can access the service provided by the third-party account.

Alternatively, in reference to FIG. 2, the third-party server denies access to the user account, if the credential input does not match the credential set or if the credential input is rejected by the access control mechanism, and if the credential set in in the unlocked status (Step F). Similar to Step E, the remote server validates the credential set because the credential set is in the unlocked status in order for the third-party server to proceed with the authentication process. However, the third-party server fails to authenticate the credential input because the credential set does not match the credential set. For example, the password may have not been correct, or the facial or biometric data respectively did not match the credential token or key. The third-party server follows standard authentication procedure by prompting to reenter the credential input or to go through an account recovery process. The third-party server may also request the user to confirm the identity of the user using authentication methods such as multi-factor authentication in case the user is the owner of the client account performing new actions when trying to access the client account. In addition, the credential input may have been rejected by the access control mechanism if the security policies of the access control mechanism are not met. For example, the administrator may have denied access to the user, even if the user submits the right credential set. As another alternative result, the third-party server invalidates access to the user account, if the credential set does or does not match the credential set, and if the credential set is in the locked status (Step G). In further detail, the remote server invalidates the credential set because the credential set is in the locked status. This prevents the third-party server from proceeding with the authentication process, even if the credential input is correct and a user metadata analysis does not result in any inconsistencies with a client event log. Instead of going through the authentication process, the third-party server invalidates access to the user account by providing an error message or error website notification to the user. Thus, an unwanted user cannot attempt to hack the user account when the credential set is in the locked status.

Figure 3:
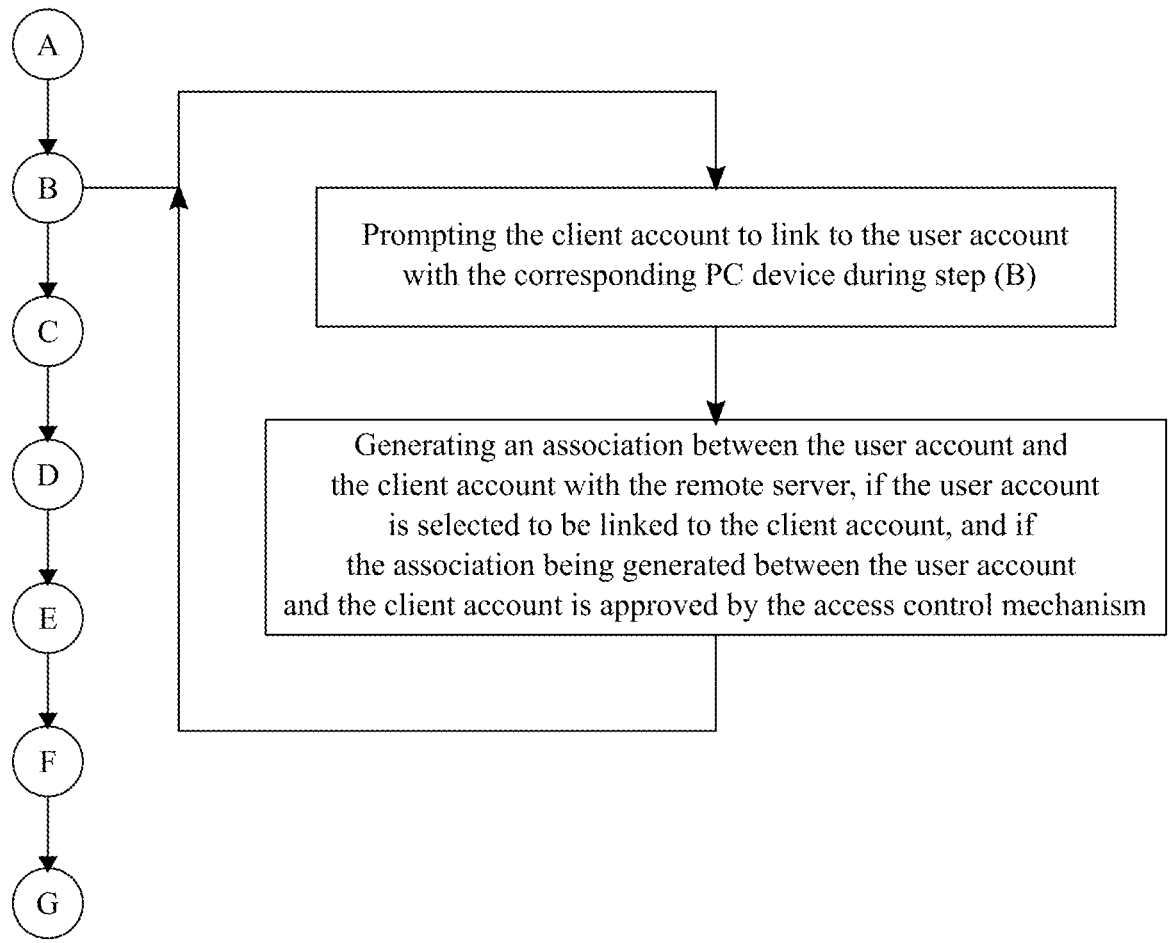
FIG. 3 is a flowchart illustrating the subprocess of linking a user account to the client account.

In order for the user to link the user account with the client account and with reference to FIG. 3, the following subprocess is executed. The corresponding PC device prompts the client account to link to the user account during Step B. In more detail, the user is prompted to link one or more user accounts from various third-party services. This can be executed in various conditions. For example, the user can be prompted to link an existing user account for a service to the client account or the user can be prompted to link a new user account for a service to the client account during the account creation process hosted by the third-party server. The remote server generates an association between the user account and the client account, if the user account is selected to be linked to the client account, and if the association being generated between the user account and the client account is approved by the access control mechanism. The association between the user account and the client account allows the remote server to validate or invalidate the credential set depending on if the credential set is in the unlocked status or the locked status. Further, the association between the user account and the client account provides the user the ability to unlock or lock the credential set. However, the association between the user account and the client account can only be done if the security policies of the access control mechanism are met.

Figure 4:
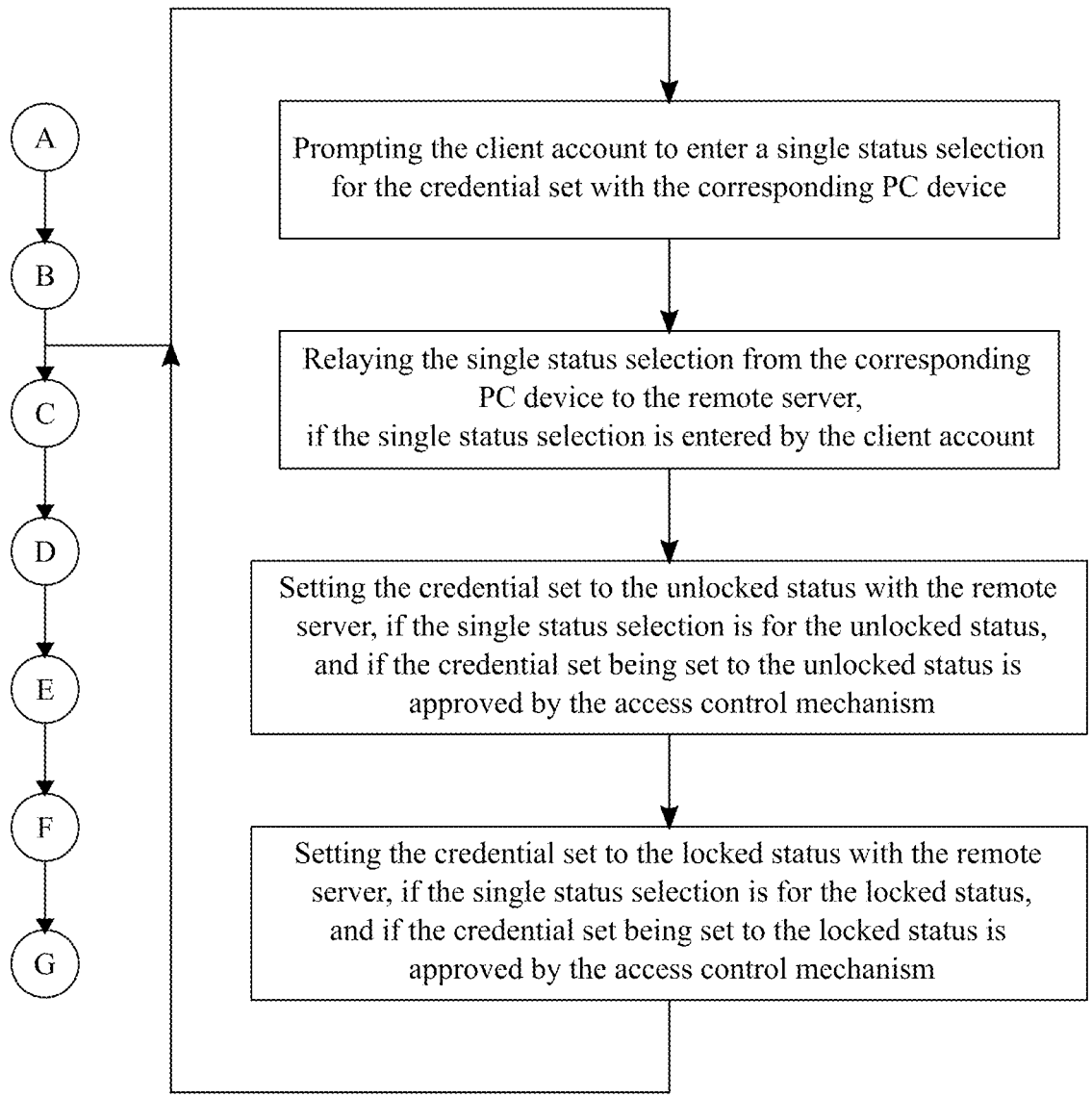
FIG. 4 is a flowchart illustrating the subprocess of toggling between the unlocked status or the locked status for the credential set.

In order for the user to toggle between the unlocked or locked status for the credential set and with reference to FIG. 4, the following subprocess is executed. The corresponding PC device prompts the client account to enter a single status selection for the credential set. In further detail, the single status selection is an input to toggle the credential set to either the unlocked status or the locked status. The single status selection is relayed from the corresponding PC device to the remote server, if the single status selection is entered by the client account. Thus, the remote server is instructed to toggle the status of the credential set based on the single status selection. The remote server sets the credential set to the unlocked status, if the single status selection is for the unlocked status, and if the credential set being set to the unlocked status is approved by the access control mechanism. Thus, the user can toggle the credential set from the locked status to the unlocked status as desired to prevent unauthorized access. Alternatively, the remote server sets the credential set to the locked status, if the single status selection is for the locked status, and if the credential set being set to the locked status is approved by the access control mechanism. Thus, the user can toggle the credential set from the unlocked status to the locked status as desired to similarly prevent unauthorized access. In both cases, the single status selection can only be done if the security policies of the access control mechanism are met.

Figure 5:
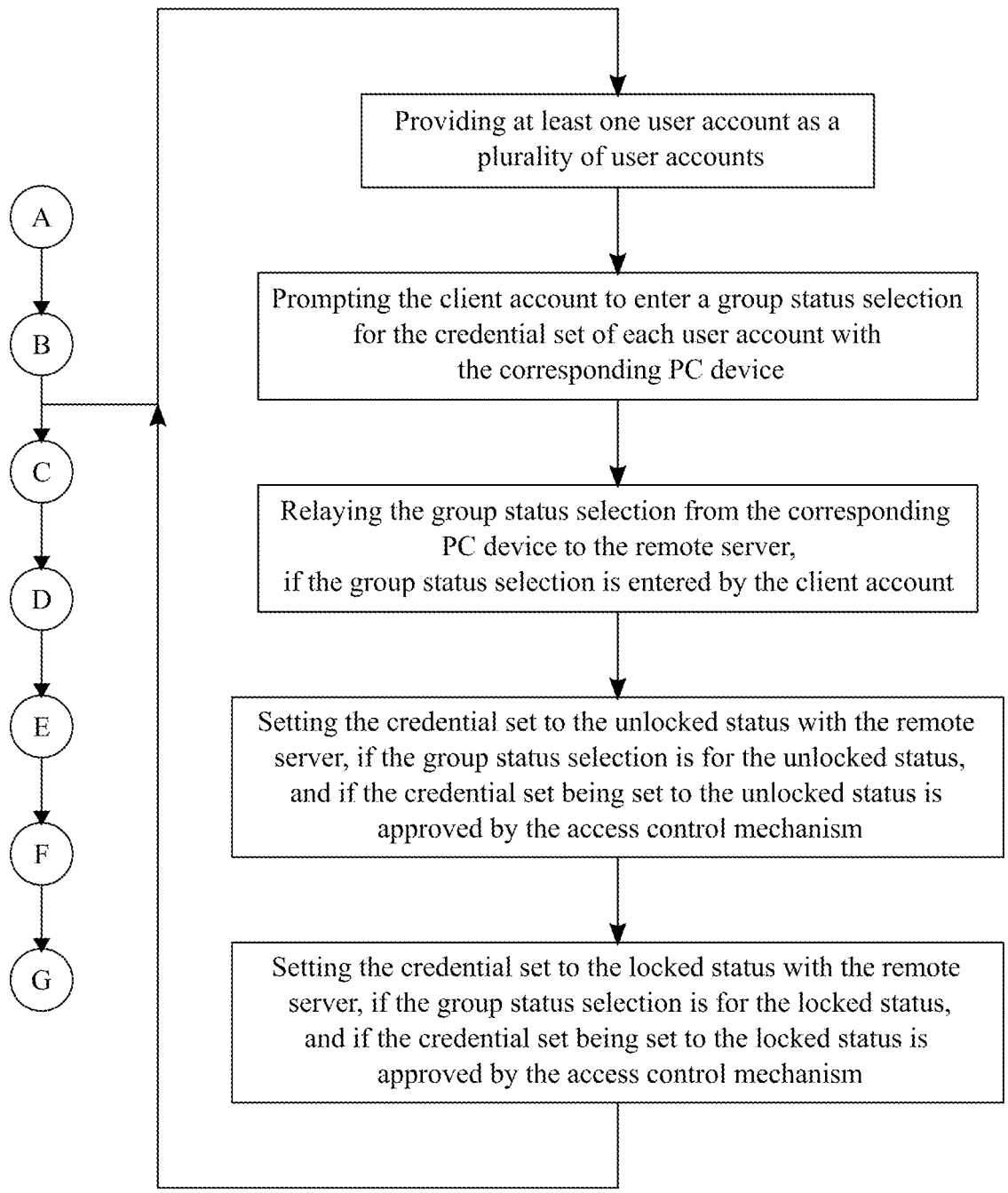
FIG. 5 is a flowchart illustrating the subprocess of toggling between the unlocked status or the locked status for at least two or all of the credential sets for a plurality of user accounts.

In order for the user to toggle between the unlocked status or the locked status for at least two or all of the credential sets for a plurality of user accounts and with reference to FIG. 5, the following subprocess is executed. The at least one user account is provided as a plurality of user accounts. The corresponding PC device prompts the client account to enter a group status selection for the credential set for each user account. In further detail, the group status selection is an input to toggle at least two or all of the credential sets for the plurality of user accounts to either the unlocked status or the locked status. The group status selection is relayed from the corresponding PC device to the remote server, if the group status selection is entered by the client account. Thus, the remote server is instructed to toggle the status of at least two or all of the credential sets based on the group status selection. The remote server sets the credential set of each user account to the unlocked status, if the group status selection is for the unlocked status, and if the credential set being set to the unlocked status is approved by the access control mechanism. Thus, the user can toggle at least two or all of the credential sets for the plurality of user accounts from the locked status to the unlocked status. Alternatively, the remote server sets the credential set of each user account to the locked status, if the group status selection is for the locked status, and if the credential set being set to the locked status is approved by the access control mechanism. Thus, the user can toggle at least two or all of the credential sets for the plurality of user accounts from the unlocked status to the locked status. In both cases, the group status selection can only be done if the security policies of the access control mechanism are met.

Figure 6:
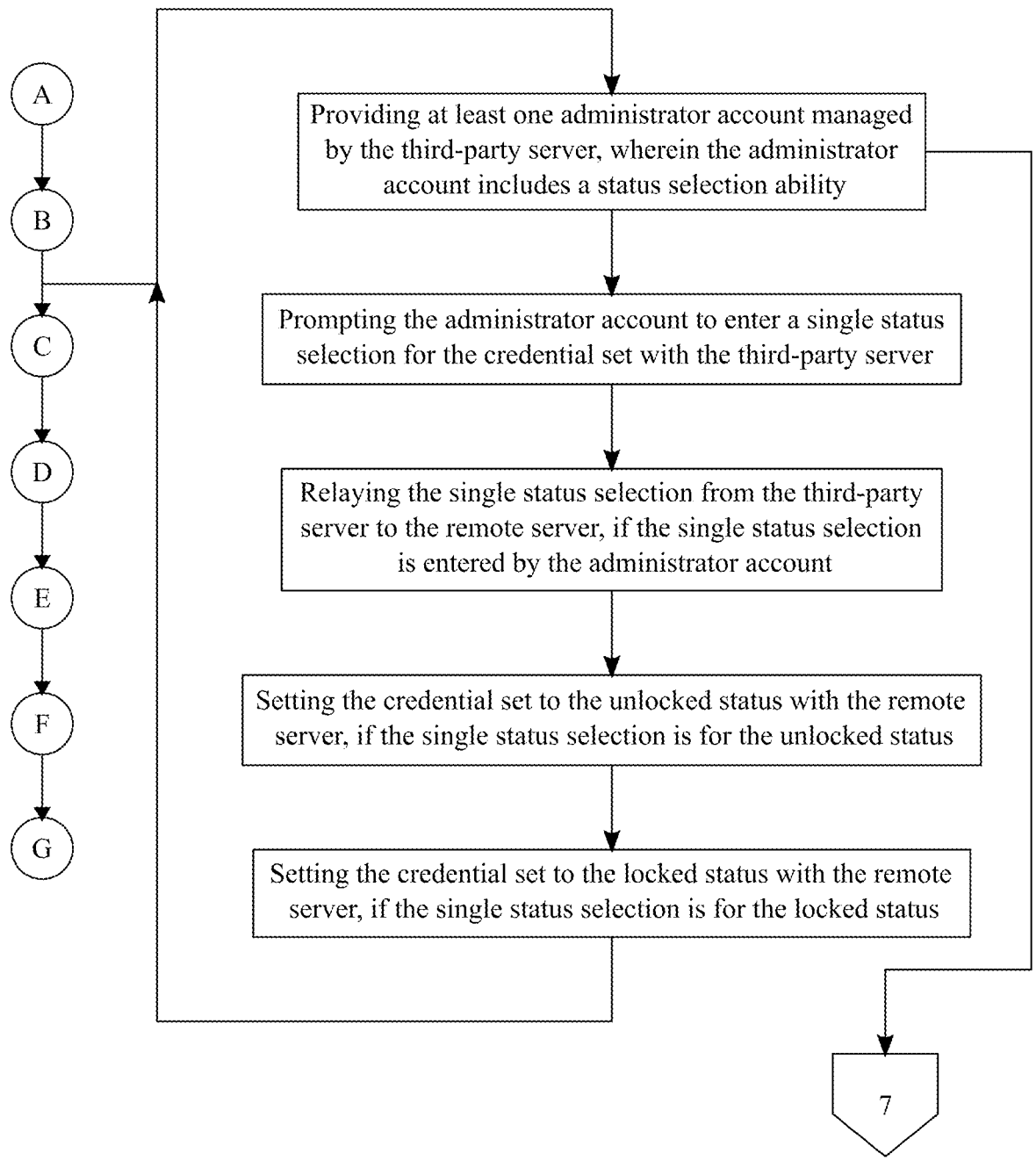
FIG. 6 is a flowchart illustrating the subprocess of an administrator account of the third-party server toggling between the unlocked status or the locked status for the credential set.

As mentioned previously and with reference to FIG. 6, the service provider of the third-party server can toggle between the unlocked status or the locked status for the credential set. This is executed through the following subprocess. The third-party server manages at least one administrator account that includes a status selection ability. The administrator account is the account used by the service provider in order manage the user account. The third-party server prompts the administrator account to enter a single status selection for the credential set so that the administrator account may adjust the single status of the credential set. In further detail, the single status selection is an input to toggle the credential set to either the unlocked status or locked status. The single status selection is relayed from the third-party server to the remote server, if the single status selection is entered by the administrator account. Thus, the remote server is instructed to toggle the status of the credential set based on the single status selection by the administrator account. The remote server sets the credential set to the unlocked status, if the single status selection is for the unlocked status. In more detail, if the user cannot personally toggle the credential set from the unlocked status to the locked status, the service provider of the third-party server can toggle the credential set to the unlocked status in order for the user to access the user account. Thus, the service provider can toggle the credential set from the locked status to the unlocked status. Alternatively, the remote server sets the credential set to the locked status, if the single status selection is for the locked status. In more detail, the service provider can automatically toggle the credential set to the locked status if the service provider notices any suspicious activity. To do so, the service provider utilizes a client event log to monitor any discrepancies in a user metadata to automatically detect suspicious activity. More specifically, the suspicious activity can be an unwanted user attempting to access the user account. Thus, the service provider can toggle the credential set from the unlocked status to the locked status to protect the client accounts.

Figure 7:
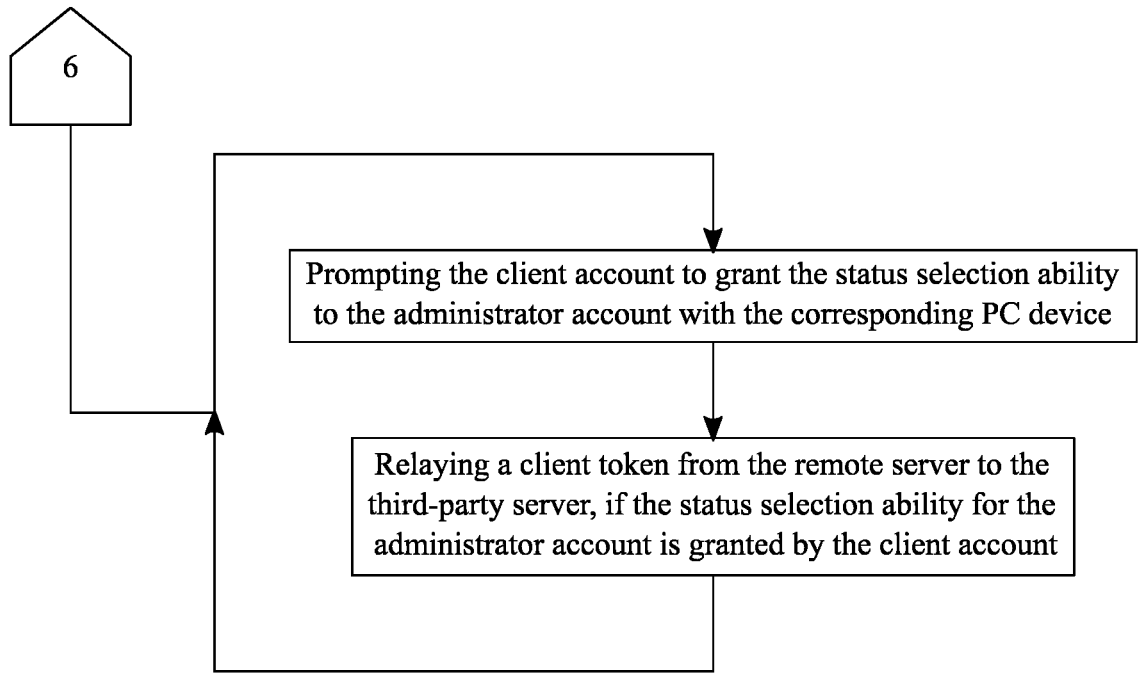
FIG. 7 is a flowchart illustrating the subprocess of the client account granting the status selection ability to the administrator account.

In order for the user to grant the status selection ability to the service provider and with reference to FIG. 7, the following subprocess is executed. The corresponding PC device prompts the client account to grant the status selection ability to the administrator account. This process is recommended when there is a high degree of trust between the user and the service provider, or if the service provider requires administrative access to the plurality of user accounts. For example, the relationship between the service provider and the user is for a device operating system or a highly privileged application service. Additionally, this process is also recommended when other authorization grant types such as, but not limited to, authorization codes are not provided by the service provider. A client token is relayed from the remote server to the third-party server, if the status selection ability for the administrator account is granted by the client account. With the client token, the service provider obtains the status selection ability, and thus, the service provider can toggle the credential set between the unlocked status or the locked status for each of the user accounts.

Figure 8:
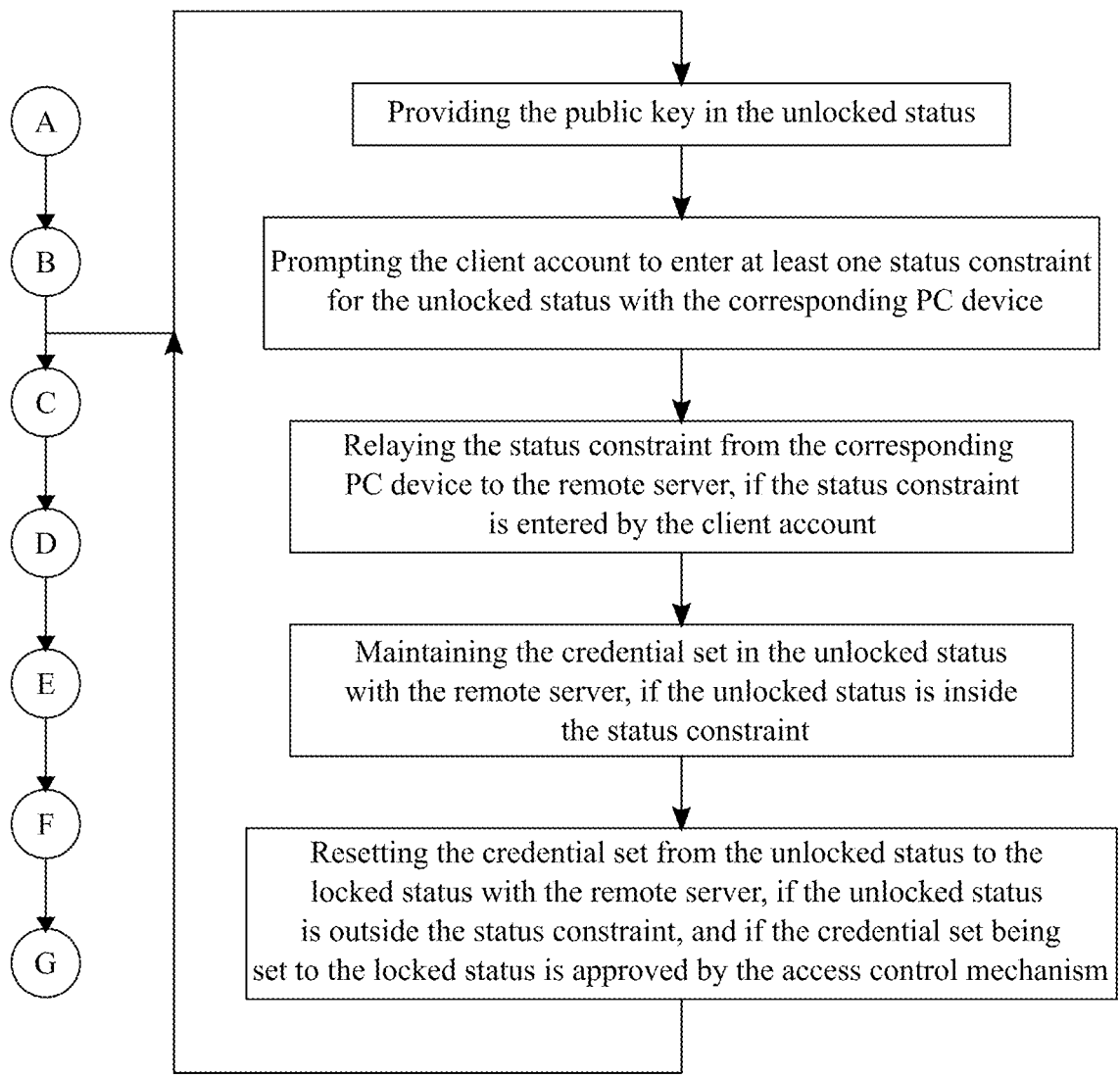
FIG. 8 is a flowchart illustrating the subprocess of applying a status constraint for the unlocked status of the credential set.

In order for the user to place a status constraint for the unlocked status of the credential set and with reference to FIG. 8, the following subprocess is executed. With the credential set already set to the unlocked status, the corresponding PC device prompts the client account to enter at least one status constraint for the unlocked status. The status constraint can be, but not limited to, a time-based constraint, a location-based constraint, or a subscription-based constraint, or a combination thereof. For example, if the status constraint is a time-based constraint, the user can set the credential set to be in the unlocked status for specified period of time. In another example, if the status constraint is a location-based constraint, the user can set the credential set to be in the unlocked status whenever the user is in a specified location. In further detail, a geofenced area may be generated, and the credential set would stay in the unlocked status or toggle to the unlocked status whenever the corresponding PC device is within or enters the generated geofenced area. This can be managed and monitored through a Global Navigation Satellite System (GNSS) device, which may be provided with the corresponding PC device. Moreover, if the status constraint is a subscription-based constraint, the user can set the credential set to be in the unlocked status for as long as a subscription to a service is active. The status constraint is relayed from the corresponding PC device to the remote server, if the status constraint is entered by the client account. Thus, the remote server is prepared to set the status constraint for the unlocked status. The remote server maintains the credential set in the unlocked status, if the unlocked status in inside the status constraint. In further detail of the aforementioned examples, the credential set remains in the unlocked status, if a specified period of time is still ongoing, if the corresponding PC device is within a specified geofenced area, if the subscription to a service is active, or if a combination thereof. Further, the remote server resets the credential set from the unlocked status to the locked status, if the unlocked status is outside the status constraint, and if the credential set being set to the locked status is approved by the access control mechanism. In further detail of the aforementioned examples, the credential set is toggled from the unlocked status to the locked status, if the specified period of time has lapsed, if the corresponding PC device is outside a specified geofenced area, if the subscription to a service is canceled or expired, or if a combination thereof. The status constraint must meet the security policies of the access control mechanism so that the credential set can be reset if the unlocked status is outside the status constraint. Thus, the user is able to place a status constraint for the unlocked status of the credential set.

Figure 9:
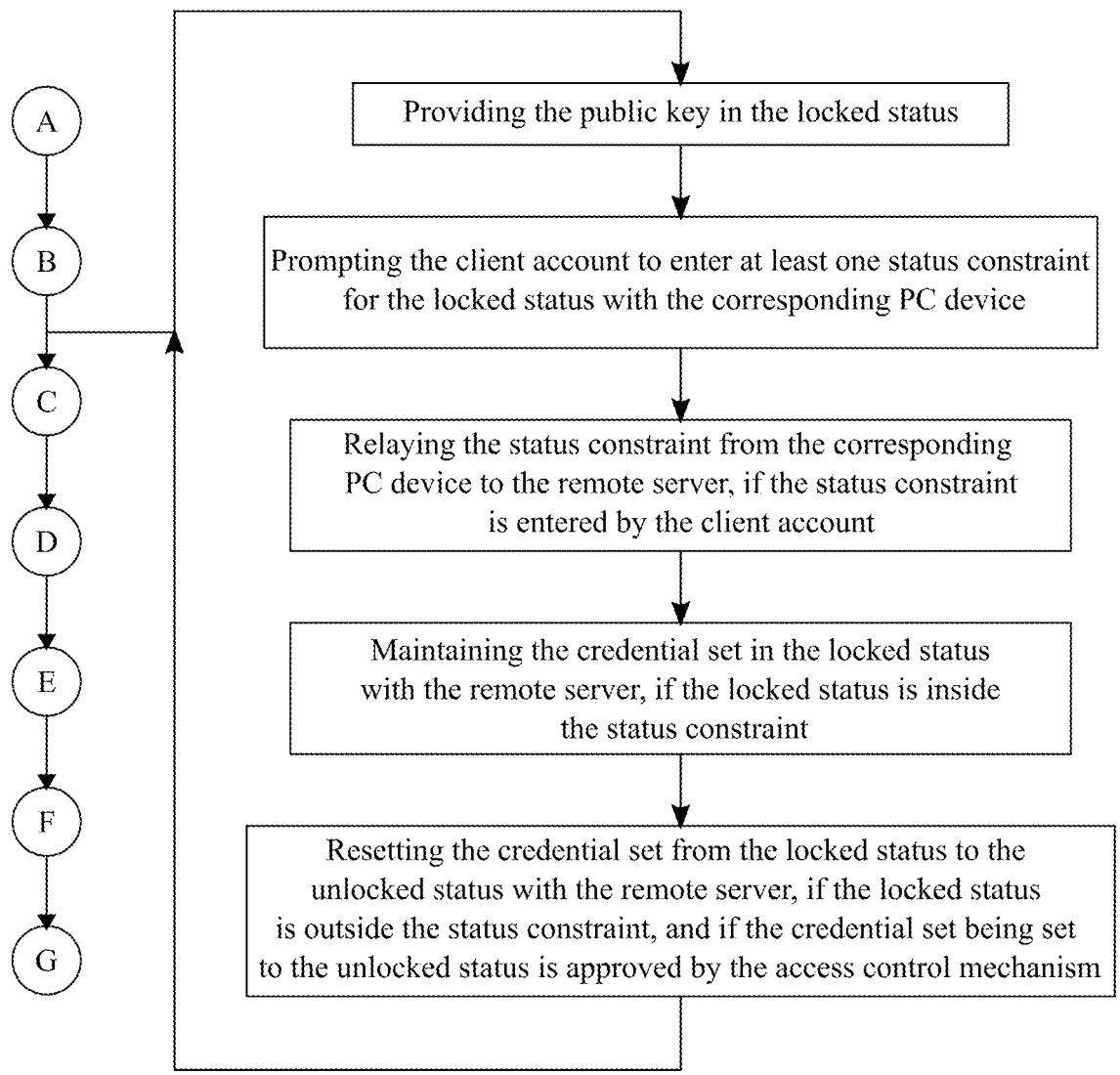
FIG. 9 is a flowchart illustrating the subprocess of applying a status constraint for the locked status of the credential set.

Alternatively, and with reference to FIG. 9, the user can place a status constraint for the locked status of the credential set through the following subprocess. With the credential set already set to the locked status, the corresponding PC device prompts the client account to enter at least one status constraint for the locked status. The status constraint can be any type of constraint such as those aforementioned examples. The status constraint is relayed from the corresponding PC device to the remote server, if the status constraint is entered by the client account. Thus, the remote server is prepared to set the status constraint for the locked status. The remote server maintains the credential set in the locked status, if the locked status in inside the status constraint. In further detail of the aforementioned examples, the credential set remains in the locked status, if a specified period of time is still ongoing, if the corresponding PC device is within a specified geofenced area, if the subscription to a service is active, or a combination thereof. Further, the remote server resets the credential set from the unlocked status to the locked status, if the unlocked status is outside the status constraint, and if the credential set being reset to the unlocked status is approved by the access control mechanism. In further detail, the credential set is toggled from the locked status to the unlocked status, if the specified period of time has lapsed, if the corresponding PC device is outside a specified geofenced area, if the subscription to a service is reactivated, or if a combination thereof. The status constraint must meet the security policies of the access control mechanism so that the credential set can be reset if the locked status is outside the status constraint. Thus, user is able to place a status constraint for the locked status of the credential set.

Figure 10:
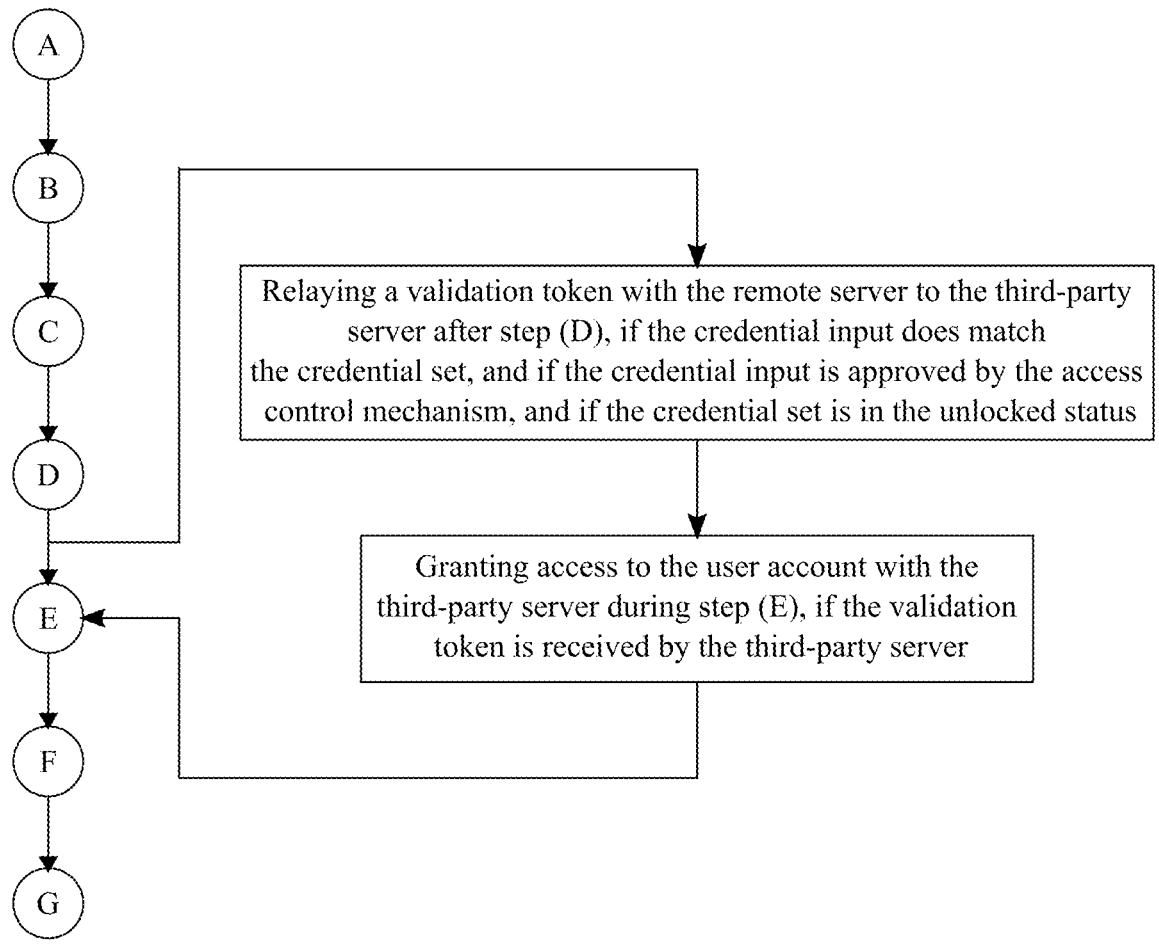
FIG. 10 is a flowchart illustrating the subprocess of the remote server validating the credential set, because the credential set is in the unlocked status, in order for the third-party server to grant access to the user account.

In order for the remote server to validate the credential set before authentication is processed by the third-party server and with reference to FIG. 10, the following subprocess is executed. Before the third-party server can authenticate the credential input provided by the client account, the third-party server requests a validation token from the remote server to check the status of the credential set. The validation token is a data package that includes information regarding the locked status of the credential set. The validation token is relayed with the remote server to the third-party server after Step D, if the credential input does match the credential set, and if the credential input is approved by the access control mechanism, and if the credential set is in the unlocked status. The third-party server can then proceed with the authentication process. The third-party server grants access to the user account during Step E, if the validation token is received by the third-party server. In further detail, access is granted because the credential input matches the credential set and because a collected user metadata corresponds to the user profile by using a client event log. Further, access is granted because the security policies of the access control mechanism are met. For example, the administrator granted access to the user to proceed with the login request. Therefore, the credential input passed the authentication process, and the credential set is validated to be in the unlocked status for validation purposes.

Figure 11:
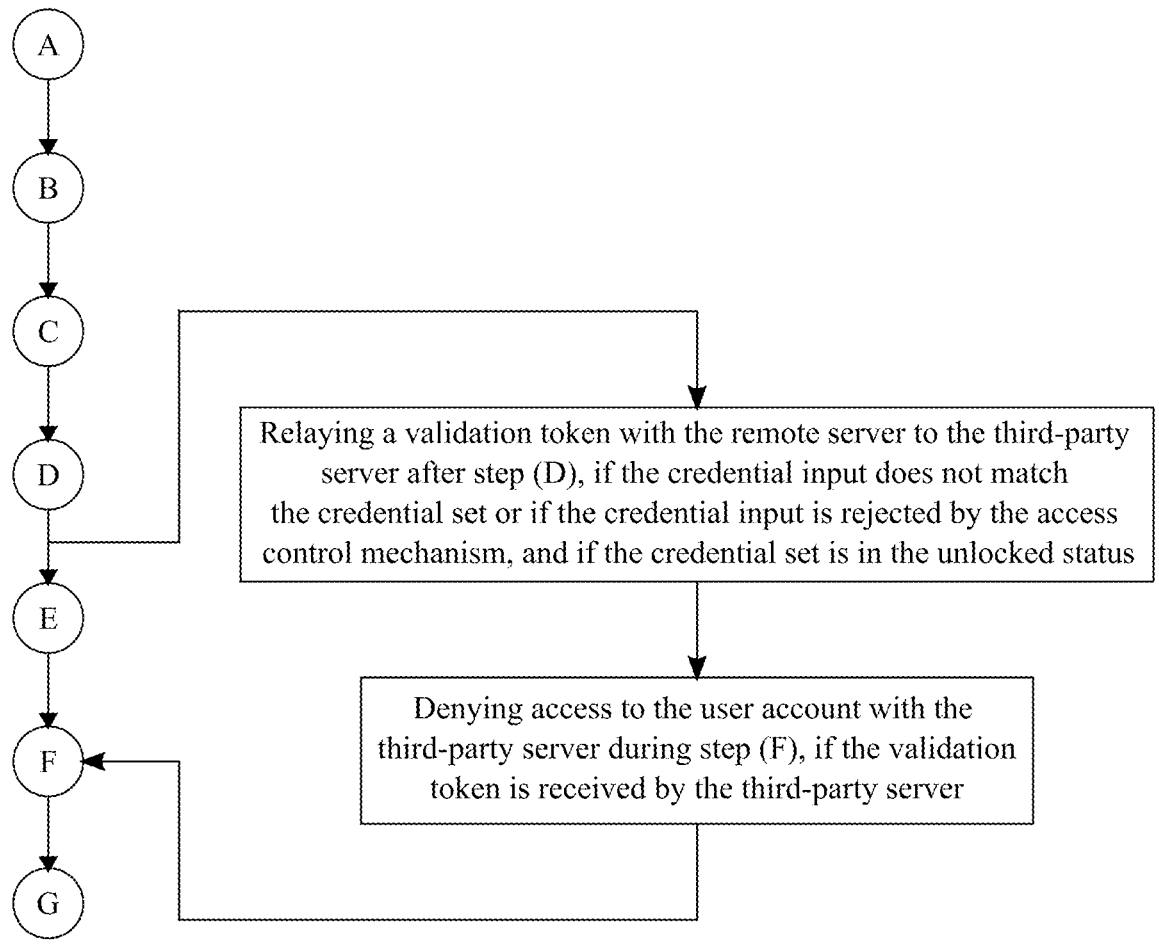
FIG. 11 is a flowchart illustrating the subprocess of the remote server validating the credential set, because the credential set is in the unlocked status, in order for the third-party server to deny access to the user account.

Alternatively, and with reference to FIG. 11, the validation token is also relayed with the remote server to the third-party server after Step D, if the credential input does not match the credential set or if the credential input is rejected by the access control mechanism, and if the credential set is in the unlocked status. In this situation, since the credential set is in the unlocked status, the third-party server can then proceed with the authentication process. However, the third-party server denies access to the user account during Step F, if the validation token is received by the third-party server, due to the credential input not matching the credential set or if the access control mechanism denies access. In further detail, access is denied because the credential input does not match the credential set, and therefore, the credential input failed the authentication pre-process, and the credential set was validated to be in the unlocked status. Furthermore, the access control mechanism denied access due to the security guidelines not being met, such as the administrator not granting access to the user.

Figure 12:
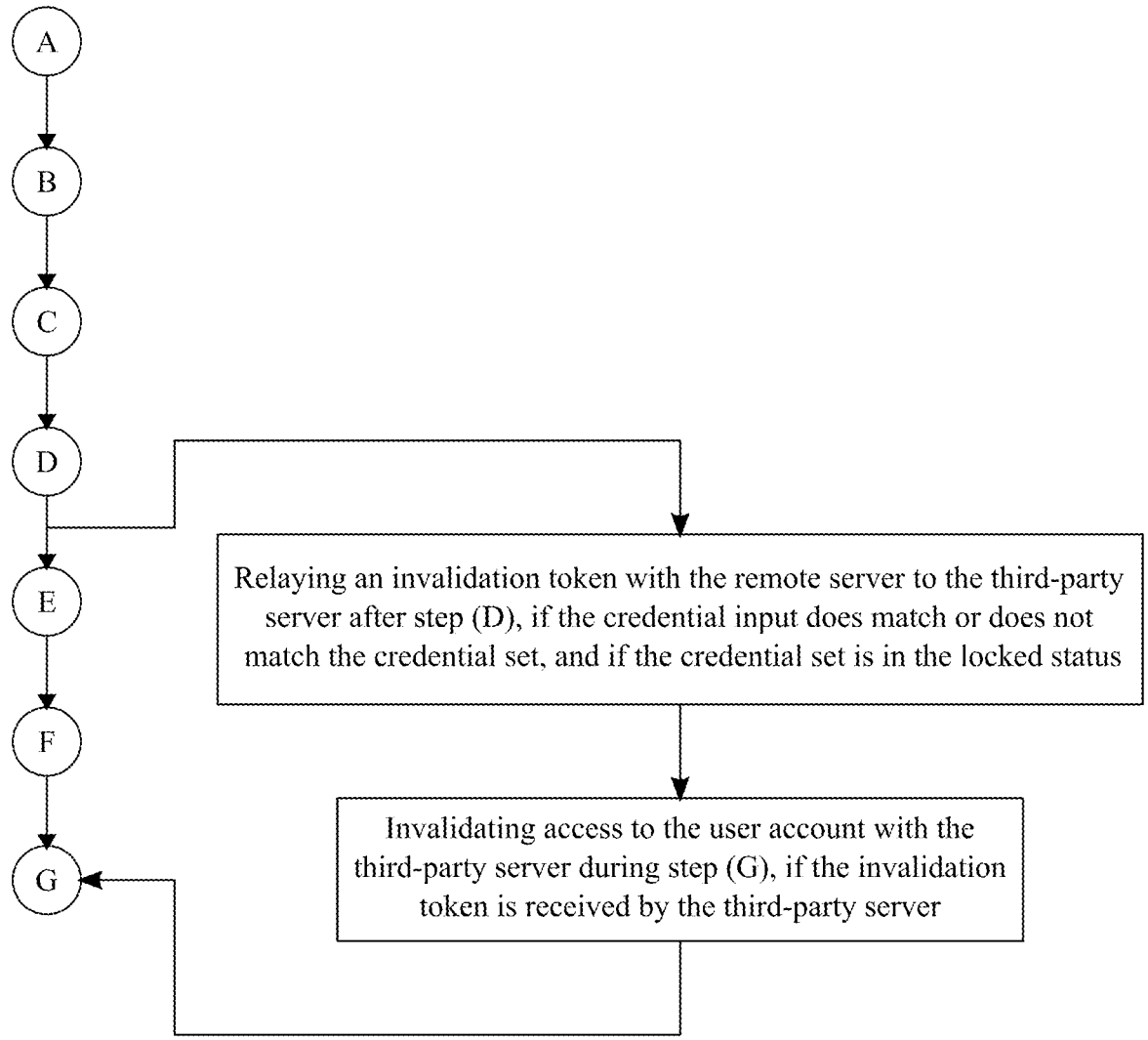
FIG. 12 is a flowchart illustrating the subprocess of the remote server invalidating the credential set, because the credential set is in the locked status, in order for the third-party server to invalidate access to the user account.

In order for the remote server to invalidate the credential set before authentication is processed by the third-party server, and with reference to FIG. 12, the following subprocess is executed. Before the third-party server can authenticate the credential input provided by the client account, the third-party server requests a token from the remote server. An invalidation token is relayed with the remote server to the third-party server after Step D, if the credential input does match or does not match the credential set, and if the credential set is in the locked status. Like the validation token, the invalidation token is a data package including information regarding the locked status of the credential set. Since the credential set is in the locked status, the third-party server does not proceed with authentication process. The third-party server invalidates access to the user account during Step G, if the invalidation token is received by the third-party server. In further detail, the user account is prevented from being accessed altogether because the credential set is in the locked status. This prevents access to the client account even if the credential input matches the credential set and if a user metadata corresponds to a client event log.

Figure 13:
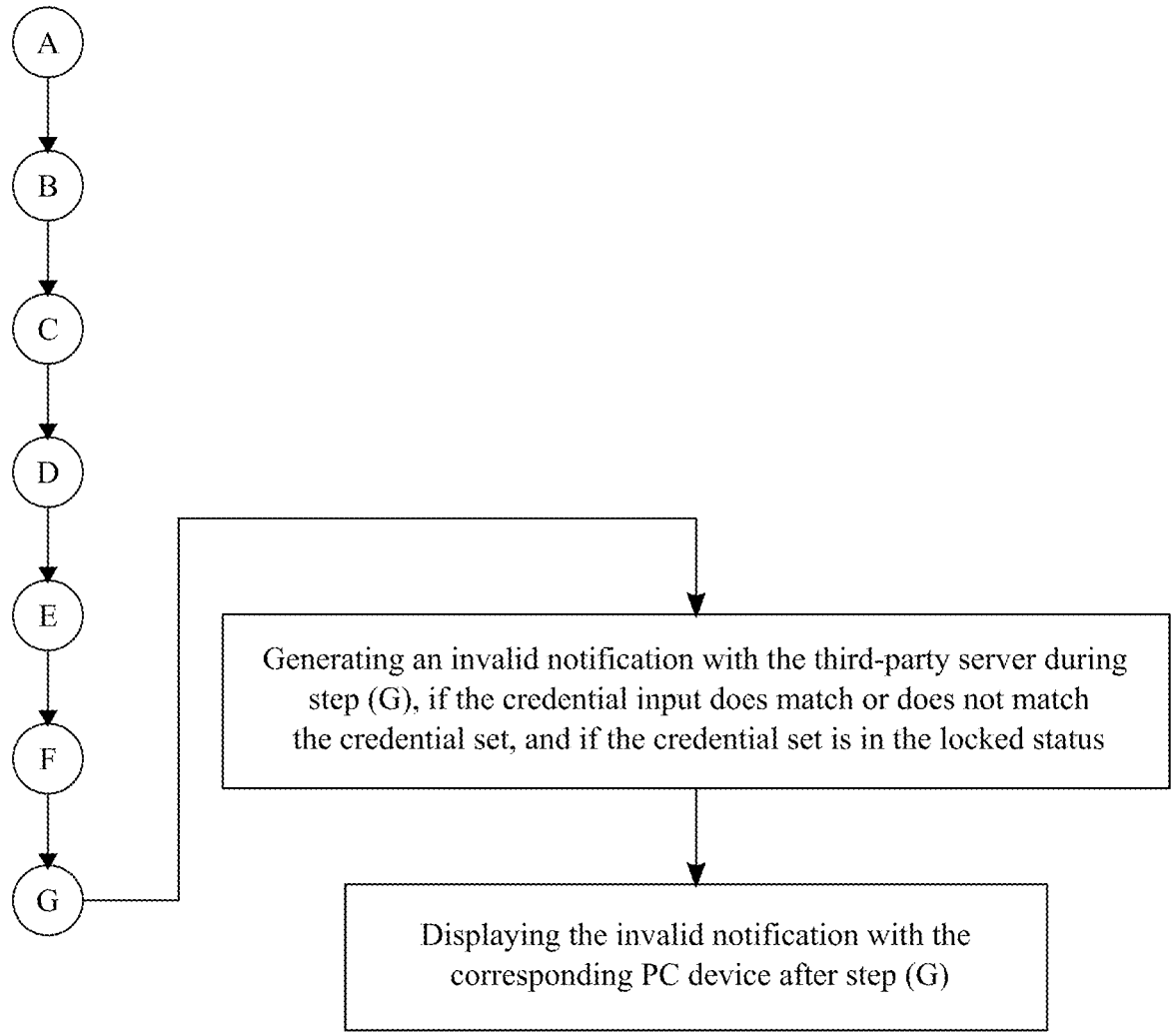
FIG. 13 is a flowchart illustrating the subprocess of displaying that the credential set is invalid.

Moreover, and with reference to FIG. 13, the third-party server generates an invalid notification during Step G, if the credential input does match or does not match the credential set, and if the credential set is in the locked status. The invalid notification can be, but is not limited, an error message or an error website page which prevents access to the user account. The invalid notification is then displayed with the corresponding PC device after Step G. In further detail, the invalid notification can be displayed as a pop-up error message after the user is prevented access to the user account or the user is directed to an error website page.

Figure 14:
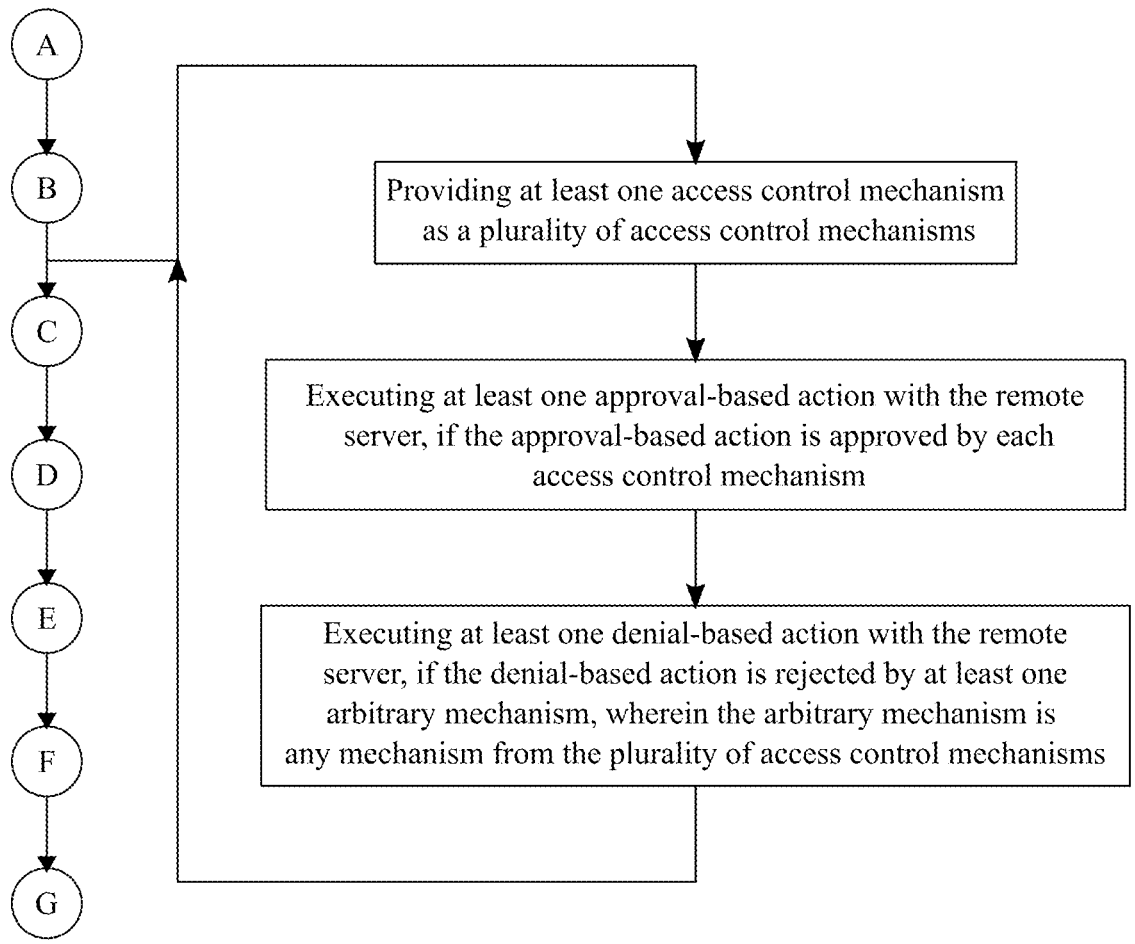
FIG. 14 is a flowchart illustrating the subprocess of configuring multiple access control mechanisms.

As previously discussed, the access control mechanism can include multiple security policies depending on the level of security of the user account and/or the client account. Accordingly, and with reference to FIG. 14, the at least one access control mechanism is provided as a plurality of access control mechanisms, each of which needs to be met to modify the lock status of the credential set. For example, the login request must need to be approved by the administrator, the user must go through multi-factor authentication, etc. To do so, the remote server executes the at least one approval-based action, if the approval-based action is approved by each access control mechanism. In further detail, the user is able to meet each security policy of the plurality of access control mechanisms to perform the approval-based action, which can be, but is not limited to, toggling the lock status of the credentials or validating the credential input during the login request. Alternatively, the remote server executes at least one denial-based action, if the denial-based action is rejected by at least one arbitrary mechanism, wherein the arbitrary mechanism is any mechanism from the plurality of access control mechanisms. Unlike the approval-based action, the denial-based action can be, but is not limited to, toggling the lock status of the credentials to locked. In further detail, the user may have failed some of the security policies of the plurality of access control mechanisms. For example, the user may have successfully performed the multi-factor authentication, but the administrator denies the login request.

Figure 15:
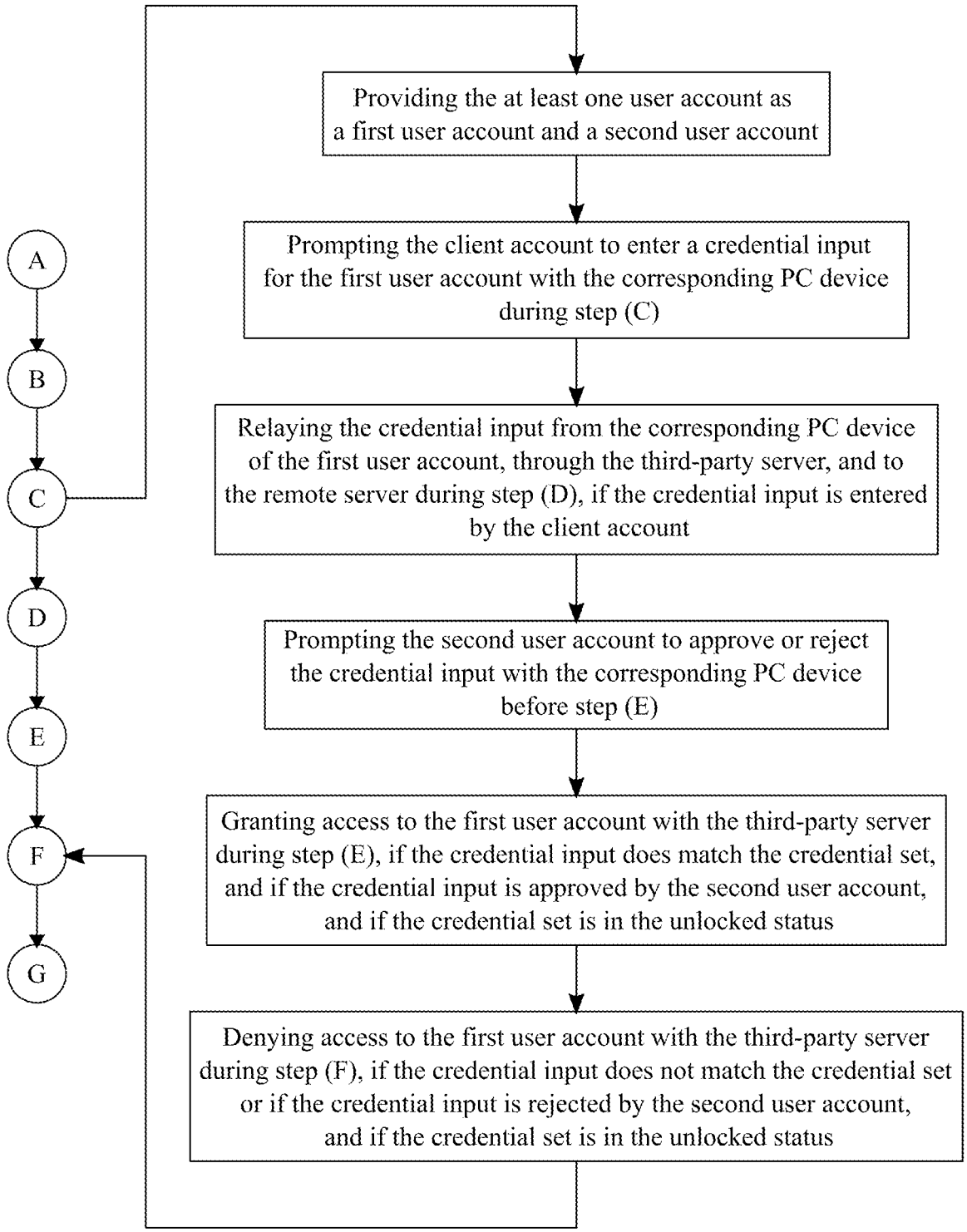
FIG. 15 is a flowchart illustrating the subprocess of configuring an access control mechanism that requires a second user to accept or deny the access request of a first user to the user account.

In one embodiment, and with reference to FIG. 15, the access control mechanism is implemented by utilizing at least one independent user to validate the login request of the user. To do so, the at least one user account is provided as a first user account and a second user account, wherein the first user account preferably corresponds to the user requesting access, and wherein the second user account corresponds to the independent user validating the access request. Like before, the corresponding PC device prompts the client account to enter a credential input for the first user account during the Step C. If the credential input has been entered by the client account, the corresponding PC device of the first user account relays the credential input through the third-party server and to the remote server during the Step D. Before the validation process can take place, the corresponding PC device prompts the second user account to approve or reject the credential input before Step E. For example, the administrator denies access to the user requesting access. Then, the third-party server grants access to the first user account during the Step E, if the credential input does match the credential set, and if the credential input is approved by the second user account, and if the credential set is in the unlocked status. In this case, the second user has approved the login request, which enables the validation process to continue. Alternatively, the third-party server denies access to the first user account during the Step F, if the credential input does not match the credential set or if the credential input is rejected by the second user account, and if the credential set is in the unlocked status. In this case, the second user may have denied the login request, which prevents the validation process to continue. In further embodiments, multiple users or systems can be employed to approve or deny the login request.

Figure 16:
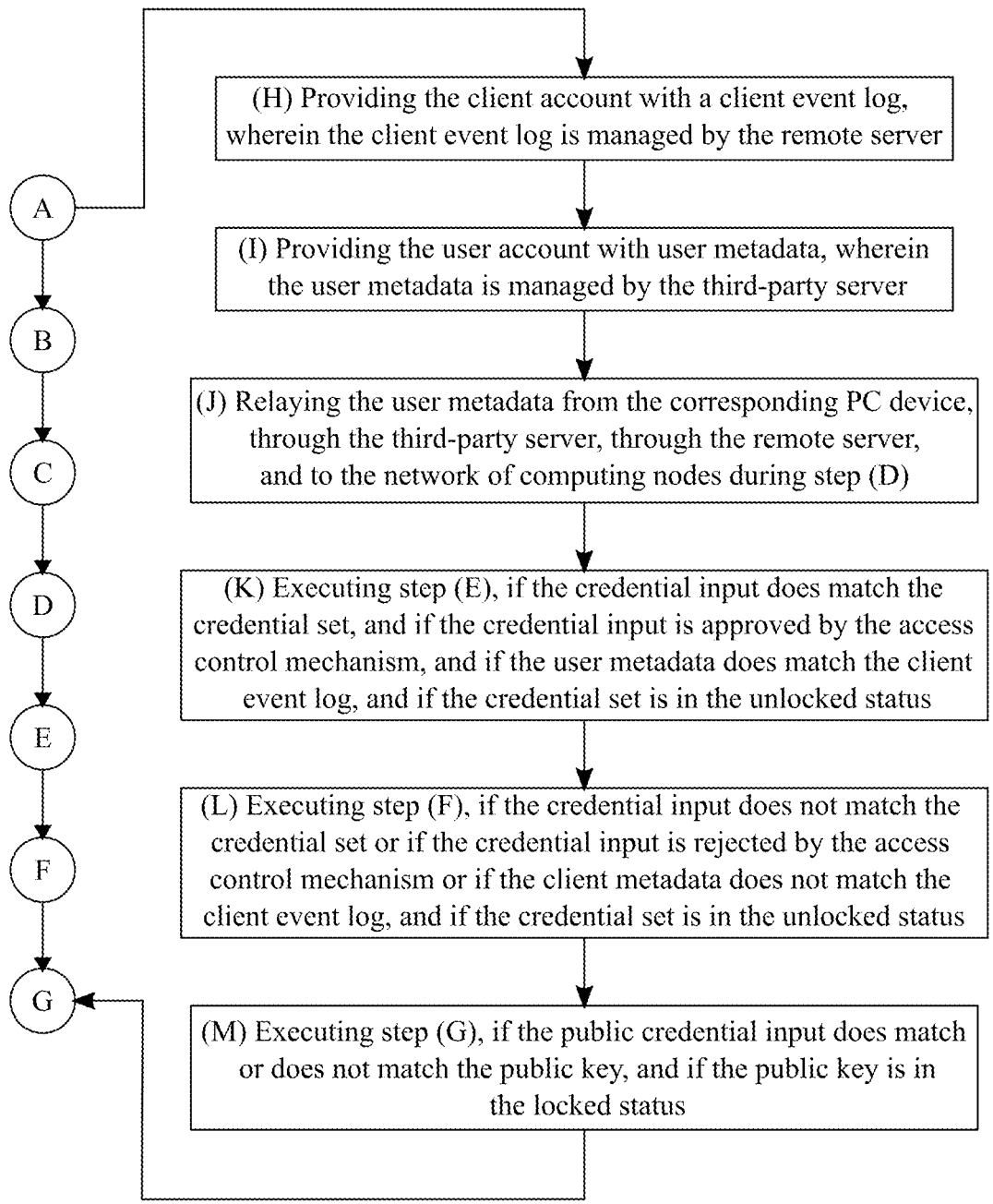
FIG. 16 is a flowchart illustrating the subprocess of collecting the user metadata to further validate the access request to the user account.

With reference to FIG. 16, the system of the present invention includes at least one remote server that manages a client event log (Step H). The client event log is a compilation of metadata that is used to form a profile of the user to further validate the login request when the user is trying to access the client account. Additionally, the user account is provided with user metadata that is managed by the third-party server (Step I). The user metadata includes, but is not limited to, data regarding the corresponding PC device, the usual geographic location of the user, and the usual timing when the user access the client account. By using the client event log for each account protection check, several patterns, rules, and machine learning algorithms can be leveraged to automatically recognize, isolate, block, and/or alert on ingress calls from potential fraudulent actors. To do so, the user metadata is relayed from the corresponding PC device, through the third-party server, through the remote server, and to the network of computing nodes during the Step D to prevent alterations to the history of the client event log (Step J). The collected user metadata can then be leveraged to allow or prevent access to the user account. If the credential input does match the credential set, and if the credential input is approved by the access control mechanism, and if the user metadata does match the client event log, and if the credential set is in the unlocked status, Step E is executed, which grants access to the user account by the third-party server (Step K). If the credential input does not match the credential set or if the credential input is rejected by the access control mechanism or if the client metadata does not match the client event log, and if the credential set is in the unlocked status, Step F is executed, which denies access to the user account by the third-party server (Step L). Further, if the credential input does match or does not match the credential set, and if the credential set is in the locked status, Step G is executed, which invalidates access to the user account by the third-party server (Step M).

Figure 17:
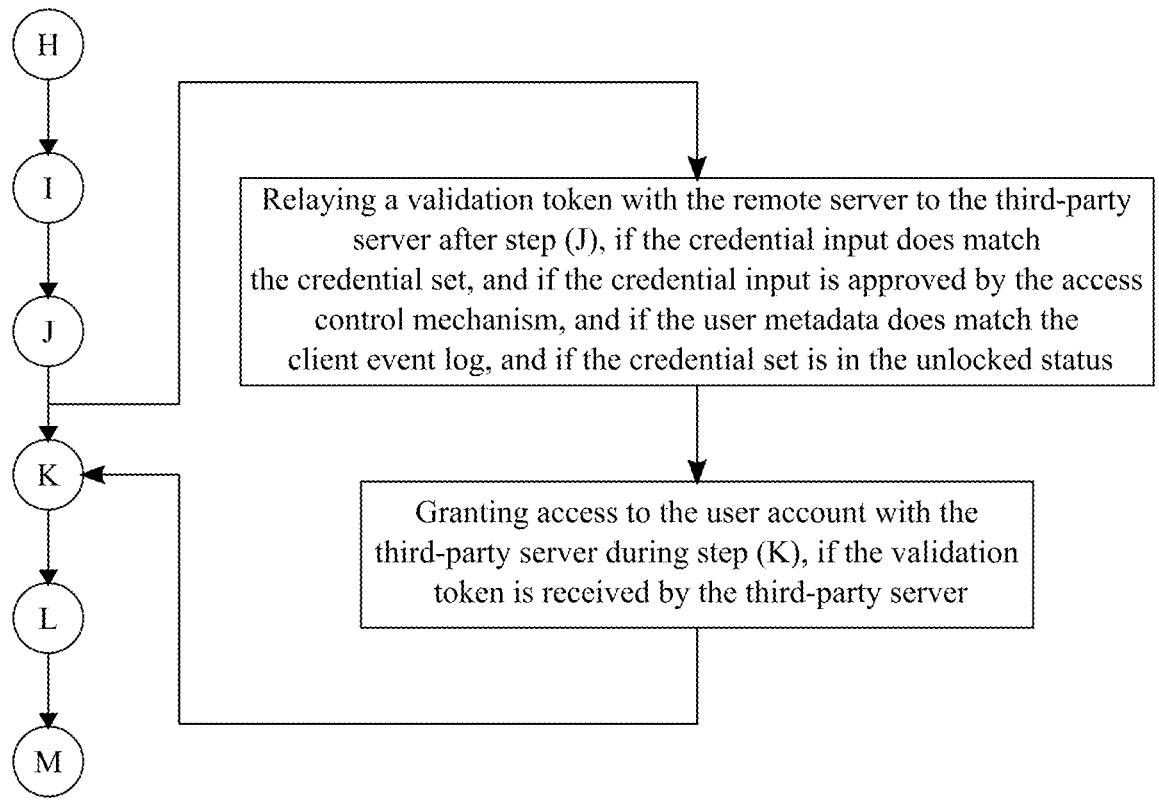
FIG. 17 is a flowchart illustrating the subprocess of the remote server validating the credential set using the user metadata, because the credential set is in the unlocked status, in order for the third-party server to grant access to the user account.

With reference to FIG. 17, the user metadata can be utilized for greater identity verification in addition to the use of the access control mechanism. Before the third-party server can authenticate the credential input provided by the client account, the third-party server requests a validation token from the remote server to check the status of the credential set. The remote server relays a validation token to the third-party server after the Step J, if the credential input does match the credential set, and if the credential input is approved by the access control mechanism, and if the user metadata does match the client event log, and if the credential set is in the unlocked status. The third-party server can then proceed with the authentication process. The third-party server grants access to the user account during Step K, if the validation token is received by the third-party server. In further detail, access is granted because the credential input matches the credential set, and the collected user metadata corresponds to the user profile by using the client event log. Therefore, the credential input passed the authentication process, and the credential set is validated to be in the unlocked status.

Figure 18:
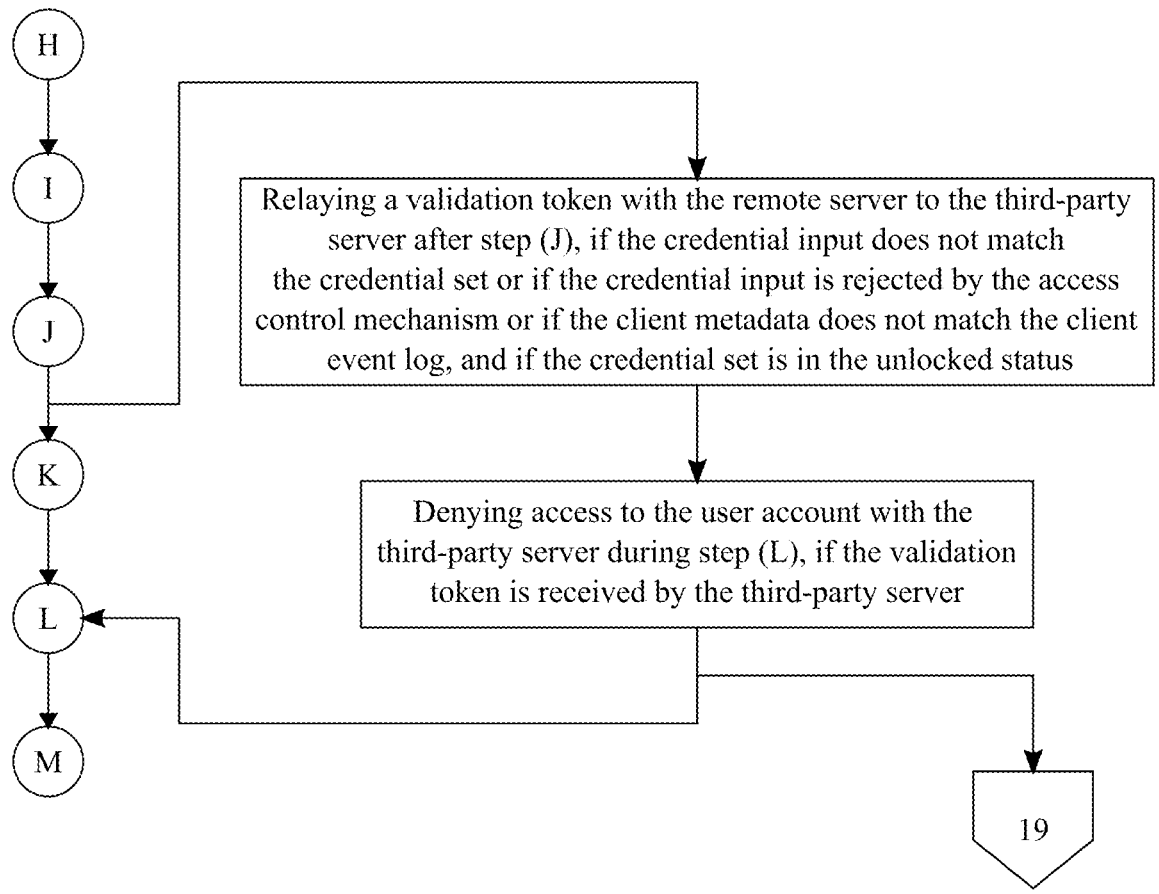
FIG. 18 is a flowchart illustrating the subprocess of the remote server validating the credential set using the user metadata, because the credential set is in the unlocked status, in order for the third-party server to deny access to the user account.
Figure 19:
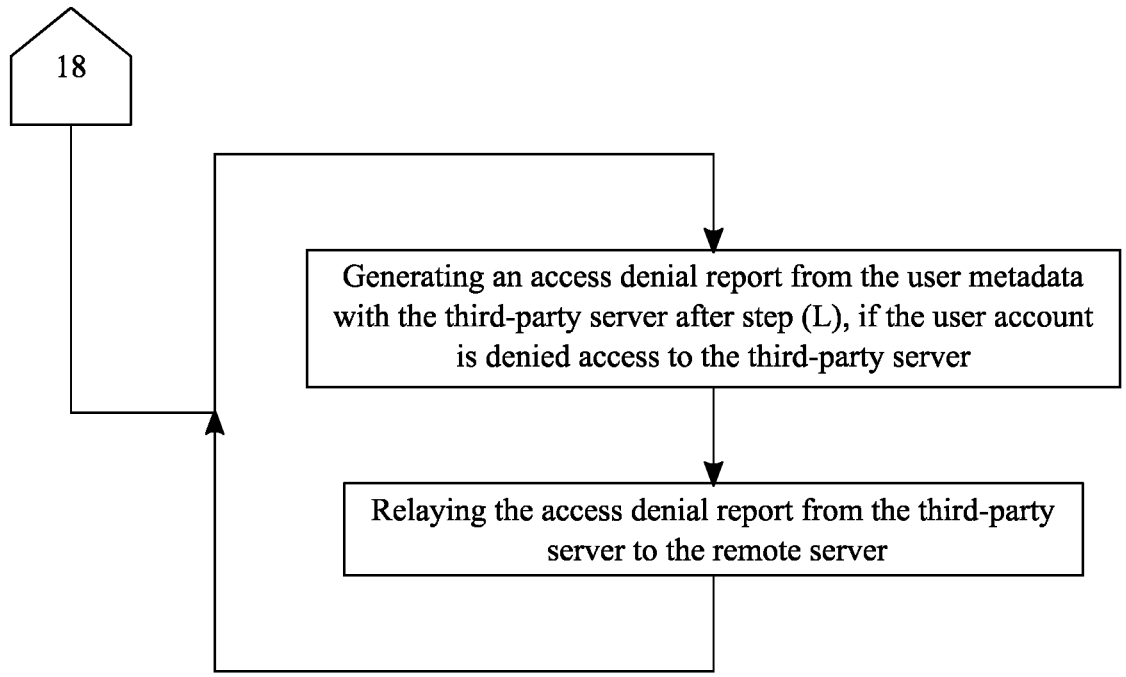
FIG. 19 is a flowchart illustrating the subprocess of the generating an access denial report if the third-party server denies access to the user account.

Alternatively, and with reference to FIG. 18, the validation token is also relayed with the remote server to the third-party server after the Step J, if the credential input does not match the credential set or if the credential input is rejected by the access control mechanism or if the client metadata does not match the client event log, and if the credential set is in the unlocked status. In this situation, the user metadata analysis results in inconsistencies or the credential input does not match the credential set. However, since the credential set is in the unlocked status, the third-party server can then proceed with the authentication process. The third-party server denies access to the user account during the Step L, if the validation token is received by the third-party server, due to the credential input not matching the credential set or the user metadata not matching the client event log. In further detail, access is denied because the credential input does not match the credential set, and therefore, the credential input failed the authentication preprocess, and the credential set was validated to be in the unlocked status. The service provider ensures this subprocess is legitimate by comparing the user metadata with the client event log. Furthermore, to keep the accuracy of the client event log up to date and to facilitate future automatic detection of fraudulent activities, and with reference to FIG. 19, the third-party server generates an access denial report from the user metadata after Step L, if the user account is denied access to the third-party server. The access denial report includes the user metadata relevant to the denied access that can be analyzed for future automatic detections of fraudulent activities. The access denial report is relayed from the third-party server to the remote server for processing and storage. From the remote server, the relevant parties can access the access denial report as necessary to perform various security evaluations.

Figure 20:
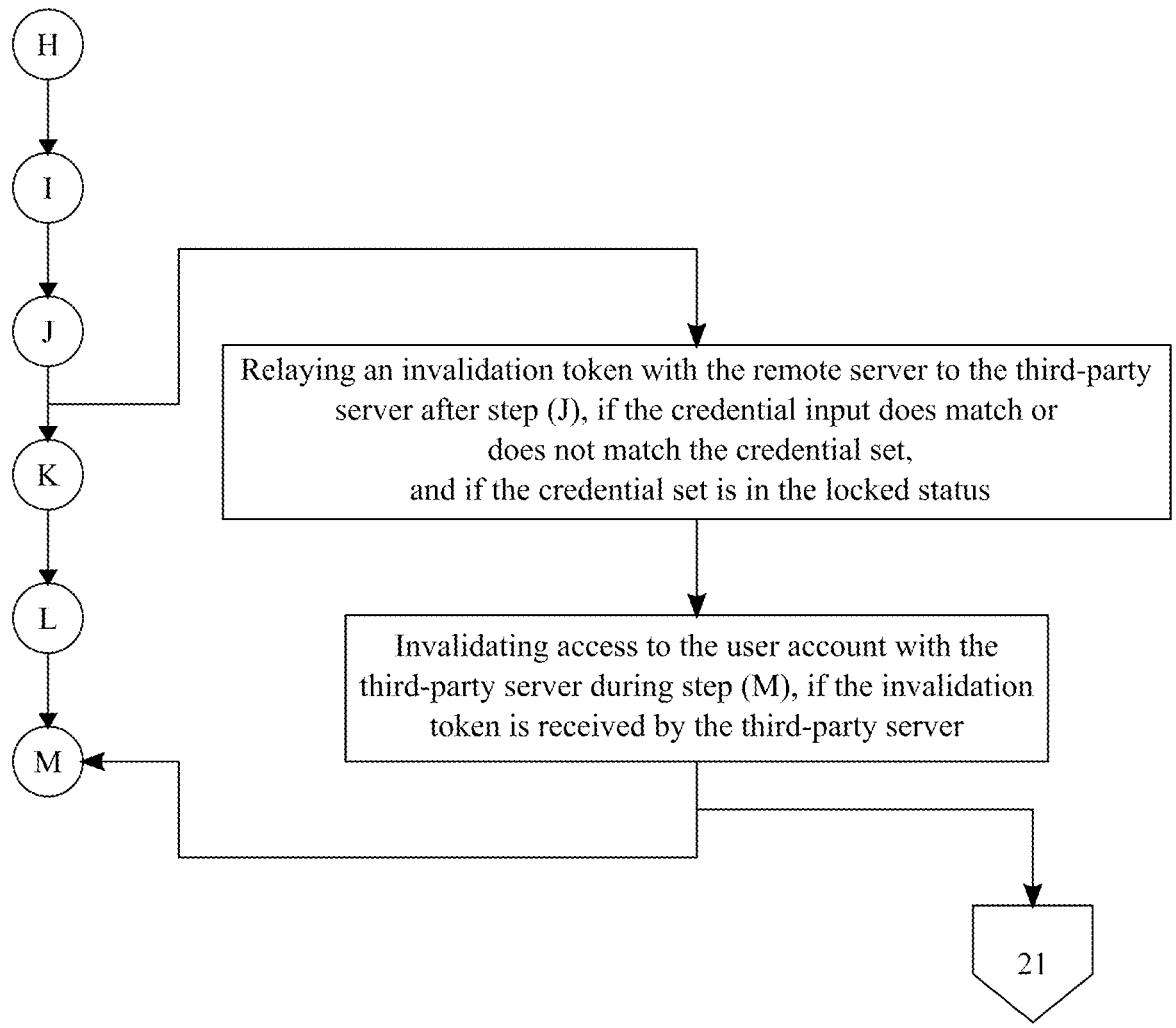
FIG. 20 is a flowchart illustrating the subprocess of the remote server invalidating the credential set using the user metadata, because the credential set is in the locked status, in order for the third-party server to invalidate access to the user account.
Figure 21:
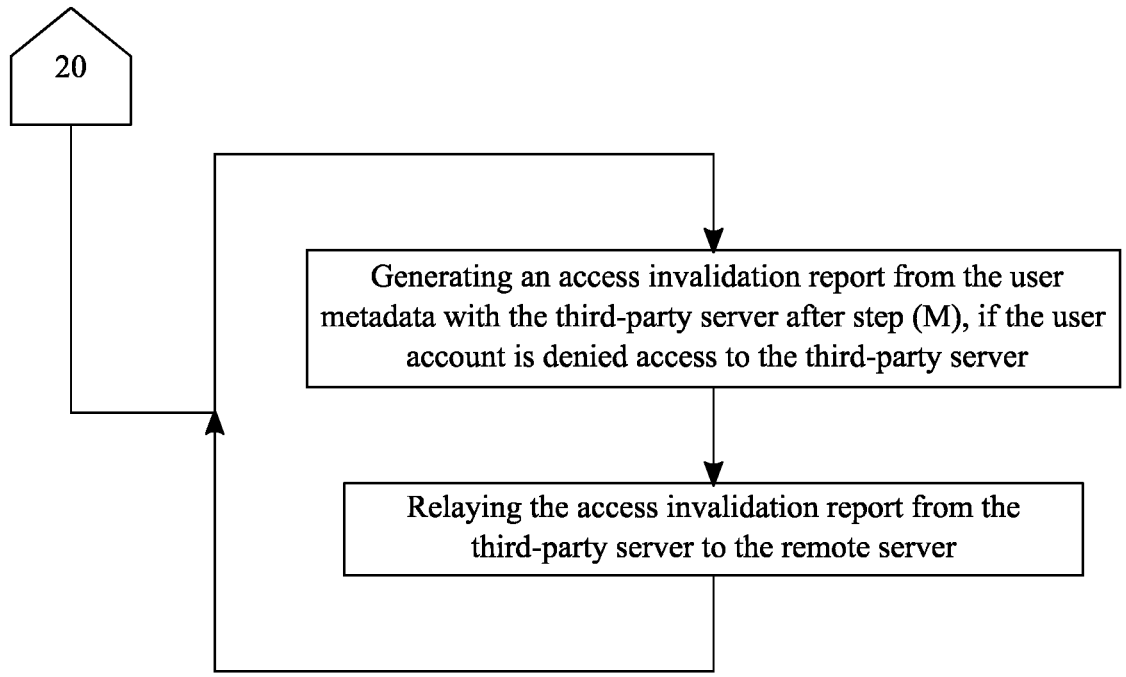
FIG. 21 is a flowchart illustrating the subprocess of the generating an access invalidation report if the third-party server invalidates access to the user account.

In order for the remote server to invalidate the credential set before authentication is processed by the third-party server, and with reference to FIG. 20, the following subprocess is executed. Before the third-party server can authenticate the credential input provided by the client account, the third-party server requests a token from the remote server. An invalidation token is relayed with the remote server to the third-party server after the Step J, if the credential input does match or does not match the credential set, and if the credential set is in the locked status. Since the credential set is in the locked status, the third-party server does not proceed with authentication process. The third-party server invalidates access to the user account during Step M, if the invalidation token is received by the third-party server. In further detail, the user account is prevented from being accessed altogether because the credential set is in the locked status. This prevents access to the client account even if the credential input matches the credential set and if the user metadata corresponds to the client event log. Furthermore, to keep the accuracy of the client event log up to date and to facilitate future automatic detection of fraudulent activities, and with reference to FIG. 21, the third-party server generates an access invalidation report from the user metadata after the Step M, if the user account is invalidated access to the third-party server. The access invalidation report includes the user metadata relevant to the invalidated access that can be analyzed for future automatic detections of fraudulent activities. The access invalidation report is relayed from the third-party server to the remote server for processing and storage. From the remote server, the relevant parties can access the access invalidation report as necessary for security evaluation purposes.

Figure 22:
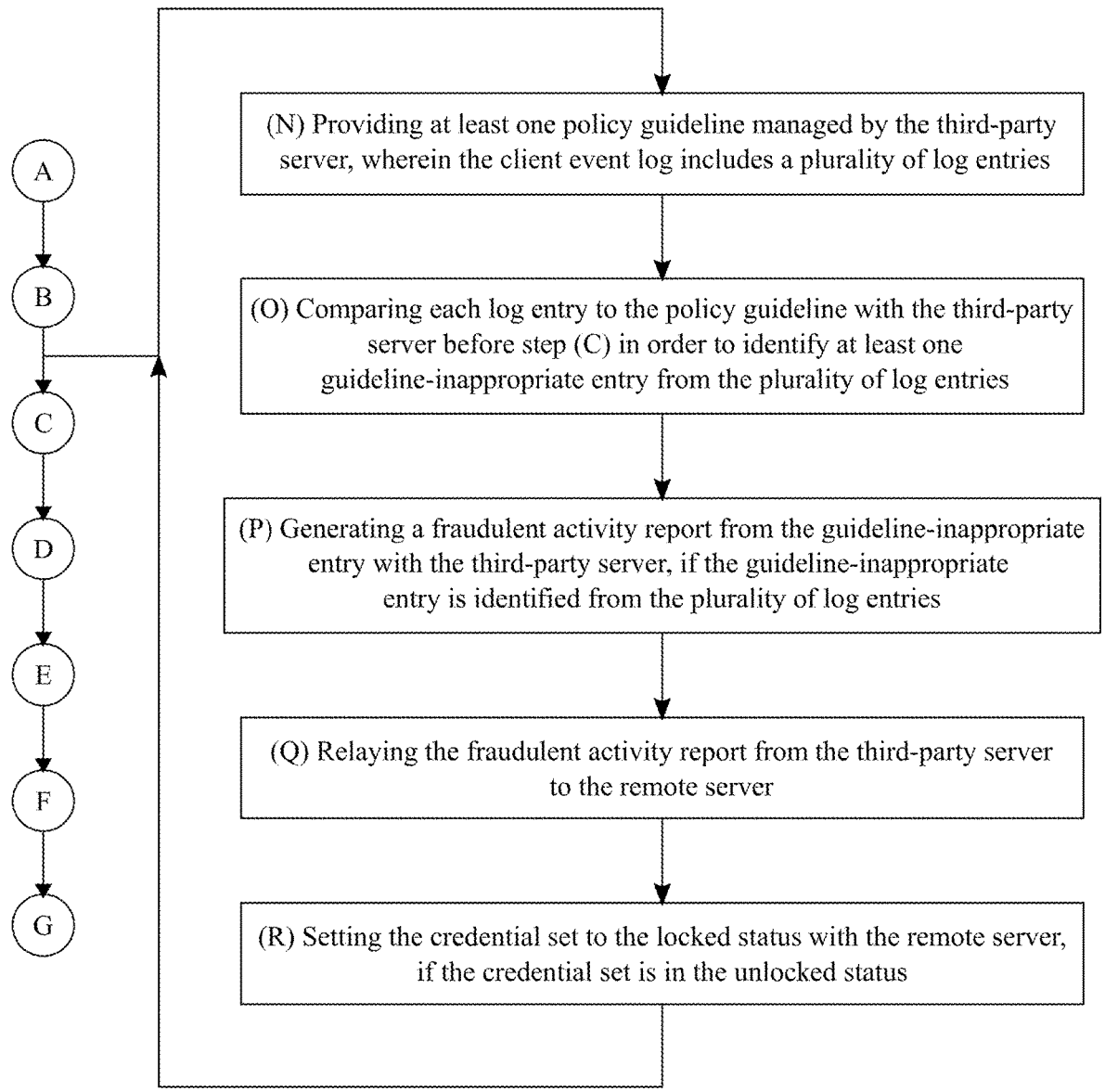
FIG. 22 is a flowchart illustrating the subprocess of modifying the policy guideline from automatic detections of guideline-inappropriate entries to automatically set the credential set to the locked status.

As previously discussed, the present invention facilitates the automatic detection of fraudulent activities during the account protection check so that the service provider can provide greater security to the client accounts. In reference to FIG. 22, to do so, the present invention is further provided with at least one policy guideline managed by the third-party server (Step N). The policy guideline includes one or more set of rules that determine when the service provider must automatically block access the client account. Further, the client event log may include a plurality of log entries. Each log entry of the plurality of log entries corresponds to the various compilations of user metadata that occur when the user tries accessing the client account. The policy guideline provides policy management features that enable the service provider to predefine the parameters required to automatically block activity from detected fraudulent PC devices based on several parameters such as, but not limited to, Internet Protocol (IP) address, IP address ranges, varying timeframes, varying geographic locations, specific user agents, specific software applications, and/or specific user/client accounts. The subprocess for facilitating the automatic detection of fraudulent activities starts by comparing each log entry to the policy guideline with the third-party server before the Step C in order to identify at least one guideline-inappropriate entry from the plurality of log entries (Step O). This enables the service provider to automatically detect any possible fraudulent activities by comparing the user metadata with the previous collected metadata in the plurality of log entries. Then, the third-party server generates a fraudulent activity report from the guideline-inappropriate entry, if the guideline-inappropriate entry is identified from the plurality of log entries (Step P). The fraudulent activity report is a compilation of data including the different fraudulent activities detected from the guideline-inappropriate entry. The fraudulent activity report is relayed from the third-party server to the remote server (Step Q) for storage and processing. Then, to protect the client account, the remote server automatically sets the credential set to the locked status, if the credential set is in the unlocked status (Step R). This way, the service provider is able to automatically detect potentially fraudulent activities and improve account protection services. For example, the service provider can return list and details of the identified fraudulent activities to external services, as well as to recommend actions to take based on the same parameters defined in the policy guidelines. For example, the service provider may call a firewall management Application Programming Interface (API) to create firewall rules dynamically, call another policy management system to create/modify a locking/enabling policy, or call intrusion detection systems to trigger for increased levels of activity monitoring.

Figure 23:
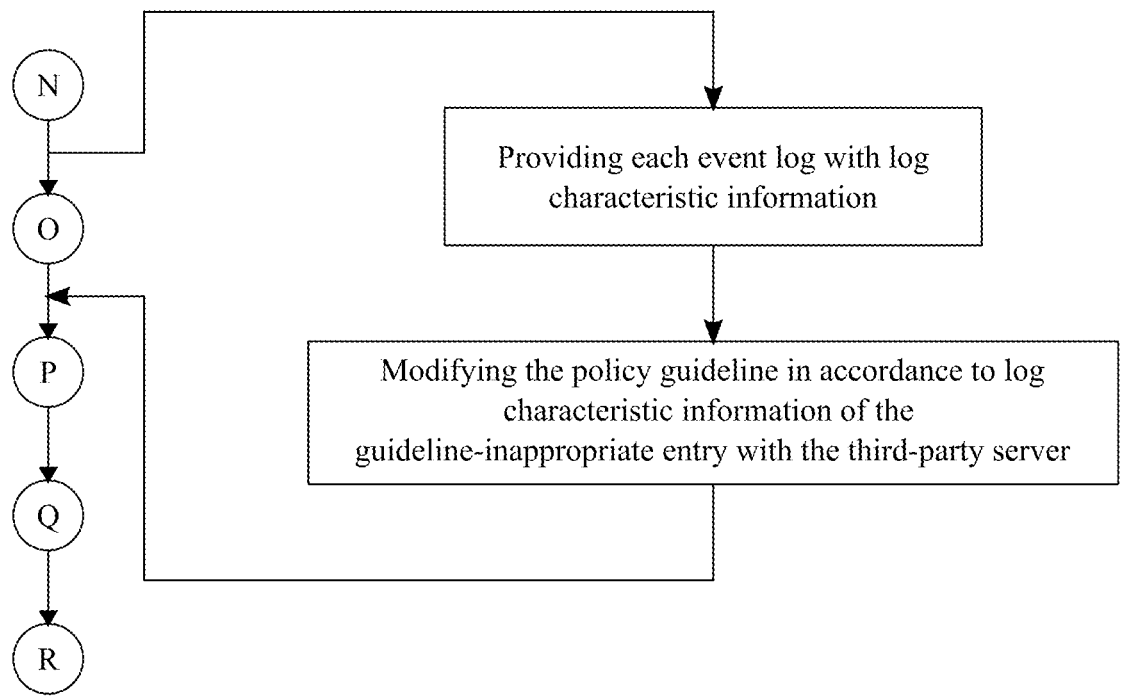
FIG. 23 is a flowchart illustrating the subprocess of modifying the policy guideline from log characteristic information of the guideline-inappropriate entry.
Figure 24:
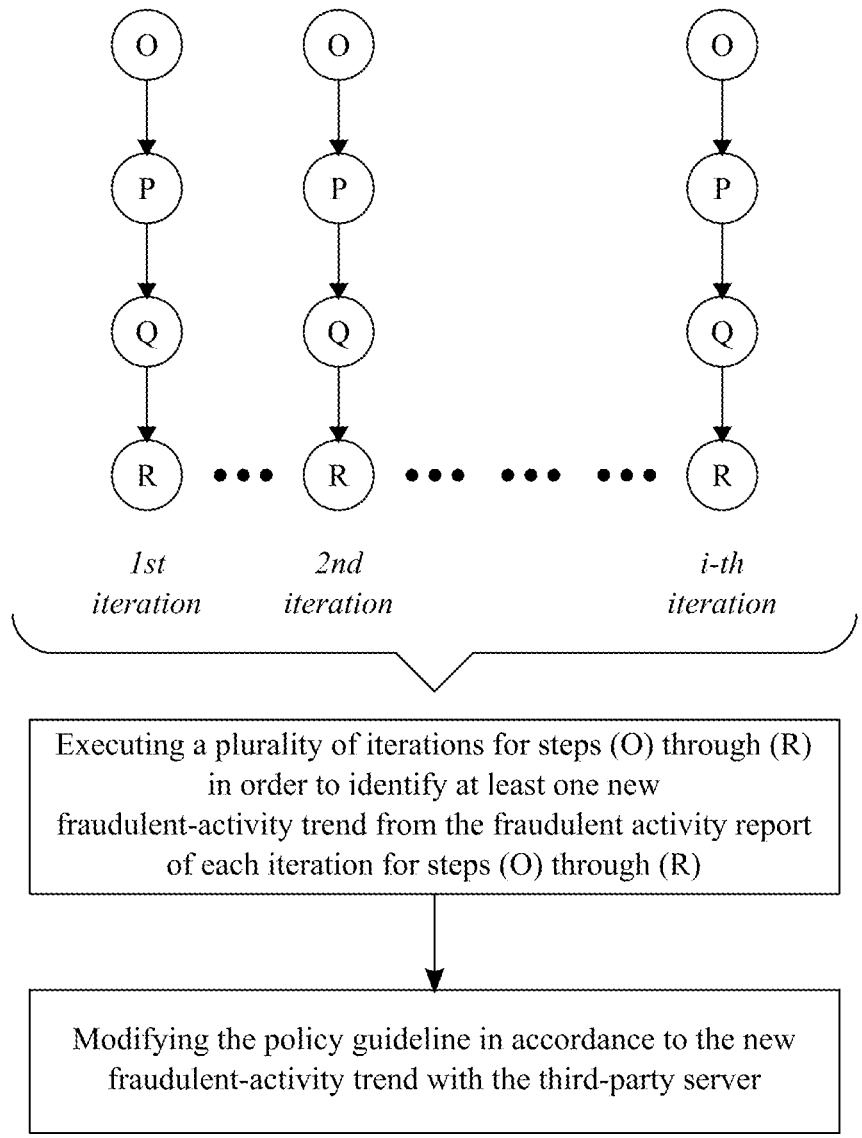
FIG. 24 is a flowchart illustrating the subprocess of modifying the policy guideline from fraudulent-activity trends identified from the fraudulent activity report.

In addition to automatically detect fraudulent activities, the present invention is able to improve the automatic detection capabilities through machine learning. In reference to FIG. 23, to do so, each event log includes log characteristic information that can be used to determine potential new fraudulent behavior not previously detected by the present invention. Then, the third-party server modifies the appropriate policy guideline in accordance to log characteristic information of the guideline-inappropriate entry. For example, a specific IP address from a foreign country may be banned if fraudulent activity is performed using said IP address. The policy guideline would be updated to block any activity from the specific IP address.

In reference to FIG. 20, the subprocess may be repeated continuously so that automatic detection capabilities are maintained up to date. To do so, a plurality of iterations for Steps O through R is executed in order to identify at least one new fraudulent-activity trend from the fraudulent activity report of each iteration for Steps O through R. Then, the third-party server modifies the policy guideline in accordance to the new fraudulent-activity trend anytime a new fraudulent behavior is detected in the log characteristic information. The continuous detection of fraudulent activities enables the reporting and analysis of PC devices, users, and geolocation activity from which potentially fraudulent activity is coming from over time. For example, if different IP addresses are detected to perform fraudulent activities and all those IP addresses come from a same geographical region or country, the policy guideline would be updated to block any activity coming from the geographical region or country. The service provider can generate maps of locations/networks, list of PC devices, networks, software applications making requests, as well as geographic locations from which the fraudulent activity is coming from. Then, the service provider or external services may be able to filter any/all these fraudulent activity parameters, including time.

Exemplary Detection Algorithms

The present invention may utilize several algorithms/patterns to determine if activity is fraudulent in nature relying on the status of the credential set and the client event log. If multiple authentications originate from a single IP, a network, or a geolocation, and are made against multiple unique credential sets which are locked, this is an indication that the actor making the requests is attempting to authenticate credentials sets not owned by them. For example, a first IP address makes authentication attempts against account A which is locked, account B which is locked, and account C which is locked over the course of two minutes (within a configurable time window). The number of failed attempts based on the lock status and the time frame over which the authentication attempts occur are configurable. Another example, requests to authenticate a credential set/account come from a first IP address. If the account was locked/unlocked in the previous two minutes from a second IP address, this means that the locking or the unlocking attempts are not coming from the same host as the one attempting to authenticate. This is also an indication of potentially fraudulent activity.

Another detection algorithm involves account locking/unlocking calls which can be restricted to be allowed only from specific status constraints given IP address, IP Ranges, geographic locations, and during specific times. For example, only the supplied IP address is allowed to lock/unlock a given credential set. If an IP address, or range of unique IP addresses, make requests to lock/unlock credential sets against a range of accounts not previously associated with the account, then this is an indication that the lock/unlock activity is potentially fraudulent and future lock/unlock (and all other requests into other systems also) can be blocked or monitored with a finer degree of event logging based on policies or rules.

Another detection algorithm involves utilizing machine learning and Artificial Intelligence (AI). The service provider can apply probabilistic classifiers to automatically compute statistical matches classifying lock/unlock related activity as potentially fraudulent. For example, the service provider can leverage Bayesian statistics to automatically compare known successful lock/unlock and authentication patterns for credential sets against known failed attempts for a given IP, IP range, geographical location, or credential set. If an account is unlocked from a given IP address and authentication using a given credential set is successful, the service provider can infer that the user is validated successfully. If, however, a different IP address makes a request unsuccessfully against an unlocked/locked account or makes multiple unsuccessful authentication attempts (credentials supplied are invalid), then the service provider can infer that the user is invalid and block activity.

Another detection algorithm involves utilizing PC device characteristics and identifiers so that the service provider can register approved devices for each account. Unlock attempts from other devices can require additional levels of authentication. For example, a PC device that has never been used to unlock an account can cause an email or text message to be sent to the email or cell phone on file with a code that must be entered or a link that must be clicked to validate that the new PC device is trusted. For highly sensitive or shared accounts, policy guidelines can be set by the user or by the organization to which the user belongs to require an N number of approvals to unlock an account. These approvals can be required either from N number of people in the organization, users within a specific group, or specific named individuals. For example, to unlock certain administrative accounts in an enterprise, the organization can apply a policy that requires N number of approvals before the account can be unlocked. For a shared bank account, both parties would have to provide approval for the account to be unlocked.

Another detection algorithm involves utilizing thresholds that can be set for unlocked accounts which only allow the credentials sets to be used an N number of times before automatically locking again. These thresholds can be chosen by the end user or enforced via policy guidelines. Policy can specify any protection check or specify failed or successful if that information is being provided to the service. For example, upon unlocking an account, a user can choose the number of times the user expects to use the credential. If the expectation is one time and the user sets the threshold to one, then the credential set will automatically relock after the next account protection check. Another detection algorithm involves users or organizations able to choose to enforce a geography check on the account when the account is unlocked by setting the allowed geographic location(s) for the account or by setting a geography during the unlock process. This would prevent bad actors from using the credentials from other geographies while the accounts are unlocked.

Further, if information about a failed login attempt after protection check is being provided, the policy guideline can be set to automatically re-lock the account after a failed login. This would provide enhanced protection, but would require users to unlock the account again after a legitimate failed login. This policy guideline can be set per credential, for groups of credentials sets, or all credentials sets. Further, if certain credentials are only meant to be used in specific locations, and if the organization can provide details from their access control system on when users have badged in and out of the location, then the credential sets can be restricted from being unlocked if the user is not badged into the building. Alternatively, the policy can be set to automatically lock and unlock the accounts when the users enter and exit the location. Further, the policy guideline can be set to require multi-function authentication to lock or unlock specific credential sets or groups of credential sets.

Although the invention has been explained in relation to its preferred embodiment, it is to be understood that many other possible modifications and variations can be made without departing from the spirit and scope of the invention as hereinafter claimed.

What is claimed is:

1. A method for facilitating an account protection check for sets of credentials, the method comprising the steps of:
  (A) providing at least one client account and at least one access control mechanism managed by at least one remote server, wherein the client account is associated with a corresponding personal computing (PC) device;
  (B) providing at least one user account managed by at least one third-party server, wherein the user account is associated with the corresponding PC device, and wherein the user account includes a credential set, and wherein the user account is associated to the client account, and wherein the credential set is either in an unlocked status or a locked status, and wherein the credential set is associated with the access control mechanism;
  (C) prompting the client account to enter a credential input for the user account with the corresponding PC device;
  (D) relaying the credential input from the corresponding PC device, through the third-party server, and to the remote server, if the credential input is entered by the client account;
  (E) granting access to the user account with the third-party server, if the credential input does match the credential set, and if the credential input is approved by the access control mechanism, and if the credential set is in the unlocked status;
  (F) denying access to the user account with the third-party server, if the credential input does not match the credential set or if the credential input is rejected by the access control mechanism, and if the credential set is in the unlocked status;
  (G) invalidating access to the user account with the third-party server, if the credential input does match or does not match the credential set, and if the credential set is in the locked status;
  (H) providing the client account with a client event log, wherein the client event log is managed by the remote server;
  (I) providing the user account with user metadata, wherein the user metadata is managed by the third-party server;
  (J) relaying the user metadata from the corresponding PC device, through the third-party server, and to the remote server during step (D);
  (K) executing step (E), if the credential input does match the credential set, and if the credential input is approved by the access control mechanism, and if the user metadata does match the client event log, and if the credential set is in the unlocked status;
  (L) executing step (F), if the credential input does not match the credential set or if the credential input is rejected by the access control mechanism or if the client metadata does not match the client event log, and if the credential set is in the unlocked status; and (M) executing step (G), if the credential input does match or does not match the credential set, and if the credential set is in the locked status.

2. The method as claimed in claim 1 comprising the steps of:
prompting the client account to link to the user account with the corresponding PC device during step (B); and
generating an association between the user account and the client account with the remote server, if the user account is selected to be linked to the client account, and if the association being generated between the user account and the client account is approved by the access control mechanism.

3. The method as claimed in claim 1 comprising the steps of:
prompting the client account to enter a single status selection for the credential set with the corresponding PC device;
relaying the single status selection from the corresponding PC device to the remote server, if the single status selection is entered by the client account;
setting the credential set to the unlocked status with the remote server, if the single status selection is for the unlocked status, and if the credential set being set to the unlocked status is approved by the access control mechanism; and
setting the credential set to the locked status with the remote server, if the single status selection is for the locked status, and if the credential set being set to the locked status is approved by the access control mechanism.

4. The method as claimed in claim 1 comprising the steps of:
providing at least one user account as a plurality of user accounts;
prompting the client account to enter a group status selection for the credential set of each user account with the corresponding PC device;
relaying the group status selection from the corresponding PC device to the remote server, if the group status selection is entered by the client account;
setting the credential set to the unlocked status with the remote server, if the group status selection is for the unlocked status, and if the credential set being set to the unlocked status is approved by the access control mechanism; and
setting the credential set to the locked status with the remote server, if the group status selection is for the locked status, and if the credential set being set to the locked status is approved by the access control mechanism.

5. The method as claimed in claim 1 comprising the steps of:
providing at least one administrator account managed by the third-party server, wherein the administrator account includes a status selection ability;
prompting the administrator account to enter a single status selection for the credential set with the third-party server;
relaying the single status selection from the third-party server to the remote server, if the single status selection is entered by the administrator account;
setting the credential set to the unlocked status with the remote server, if the single status selection is for the unlocked status; and
setting the credential set to the locked status with the remote server, if the single status selection is for the locked status.

6. The method as claimed in claim 5 comprising the steps of:
prompting the client account to grant the status selection ability to the administrator account with the corresponding PC device; and
relaying a client token from the remote server to the third-party server, if the status selection ability for the administrator account is granted by the client account.

7. The method as claimed in claim 1 comprising the steps of:
providing the credential set in the unlocked status;
prompting the client account to enter at least one status constraint for the unlocked status with the corresponding PC device;
relaying the status constraint from the corresponding PC device to the remote server, if the status constraint is entered by the client account;
maintaining the credential set in the unlocked status with the remote server, if the unlocked status is inside the status constraint; and
resetting the credential set from the unlocked status to the locked status with the remote server, if the unlocked status is outside the status constraint, and if the credential set being set to the locked status is approved by the access control mechanism.

8. The method as claimed in claim 1 comprising the steps of:
providing the credential set in the locked status;
prompting the client account to enter at least one status constraint for the locked status with the corresponding PC device;
relaying the status constraint from the corresponding PC device to the remote server, if the status constraint is entered by the client account;
maintaining the credential set in the locked status with the remote server, if the locked status is inside the status constraint; and
resetting the credential set from the locked status to the unlocked status with the remote server, if the locked status is outside the status constraint, and if the credential set being reset to the unlocked status is approved by the access control mechanism.

9. The method as claimed in claim 1 comprising the steps of:
relaying a validation token with the remote server to the third-party server after step (D), if the credential input does match the credential set, and if the credential input is approved by the access control mechanism, and if the credential set is in the unlocked status; and
granting access to the user account with the third-party server during step (E), if the validation token is received by the third-party server.

10. The method as claimed in claim 1 comprising the steps of:
relaying a validation token with the remote server to the third-party server after step (D), if the credential input does not match the credential set or if the credential input is rejected by the access control mechanism, and if the credential set is in the unlocked status; and
denying access to the user account with the third-party server during step (F), if the validation token is received by the third-party server.

11. The method as claimed in claim 1 comprising the steps of:

relaying an invalidation token with the remote server to the third-party server after step (D), if the credential input does match or does not match the credential set, and if the credential set is in the locked status; and invalidating access to the user account with the third-party server during step (G), if the invalidation token is received by the third-party server.

12. The method as claimed in claim 1 comprising the steps of:

generating an invalid notification with the third-party server during step (G), if the credential input does match or does not match the credential set, and if the credential set is in the locked status; and displaying the invalid notification with the corresponding PC device after step (G).

13. The method as claimed in claim 1 comprising the steps of:

providing at least one access control mechanism as a plurality of access control mechanisms;

executing at least one approval-based action with the remote server, if the approval-based action is approved by each access control mechanism; and executing at least one denial-based action with the remote server, if the denial-based action is rejected by at least one arbitrary mechanism, wherein the arbitrary mechanism is any mechanism from the plurality of access control mechanisms.

14. The method as claimed in claim 1 comprising the steps of:

providing the at least one user account as a first user account and a second user account;

prompting the client account to enter a credential input for the first user account with the corresponding PC device during step (C);

relaying the credential input from the corresponding PC device of the first user account, through the third-party server, and to the remote server during step (D), if the credential input is entered by the client account;

prompting the second user account to approve or reject the credential input with the corresponding PC device before step (E);

granting access to the first user account with the third-party server during step (E), if the credential input does match the credential set, and if the credential input is approved by the second user account, and if the credential set is in the unlocked status; and denying access to the first user account with the third-party server during step (F), if the credential input does not match the credential set or if the credential input is rejected by the second user account, and if the credential set is in the unlocked status.

15. The method as claimed in claim 1 comprising the steps of:

relaying a validation token with the remote server to the third-party server after step (J), if the credential input does match the credential set, and if the credential input is approved by the access control mechanism, and if the user metadata does match the client event log, and if the credential set is in the unlocked status; and granting access to the user account with the third-party server during step (K), if the validation token is received by the third-party server.

16. The method as claimed in claim 1 comprising the steps of:

relaying a validation token with the remote server to the third-party server after step (J), if the credential input does not match the credential set or if the credential input is rejected by the access control mechanism or if the client metadata does not match the client event log, and if the credential set is in the unlocked status; and denying access to the user account with the third-party server during step (L), if the validation token is received by the third-party server.

17. The method as claimed in claim 16 comprising the steps of:

generating an access denial report from the user metadata with the third-party server after step (L), if the user account is denied access to the third-party server; and relaying the access denial report from the third-party server to the remote server.

18. The method as claimed in claim 1 comprising the steps of:

relaying an invalidation token with the remote server to the third-party server after step (J), if the credential input does match or does not match the credential set, and if the credential set is in the locked status; and invalidating access to the user account with the third-party server during step (M), if the invalidation token is received by the third-party server.

19. The method as claimed in claim 18 comprising the steps of:

generating an access invalidation report from the user metadata with the third-party server after step (M), if the user account is invalidated access to the third-party server; and relaying the access invalidation report from the third-party server to the remote server.

20. The method as claimed in claim 1 comprising the steps of:

(N) providing at least one policy guideline managed by the third-party server, wherein the client event log includes a plurality of log entries;

(O) comparing each log entry to the policy guideline with the third-party server before step (C) in order to identify at least one guideline-inappropriate entry from the plurality of log entries;

(P) generating a fraudulent activity report from the guideline-inappropriate entry with the third-party server, if the guideline-inappropriate entry is identified from the plurality of log entries;

(Q) relaying the fraudulent activity report from the third-party server to the remote server; and (R) setting the credential set to the locked status with the remote server, if the credential set is in the unlocked status.

21. The method as claimed in claim 20 comprising the steps of:

providing each event log with log characteristic information; and modifying the policy guideline in accordance to log characteristic information of the guideline-inappropriate entry with the third-party server.

22. The method as claimed in claim 20 comprising the steps of:

executing a plurality of iterations for steps (O) through (R) in order to identify at least one new fraudulent-activity trend from the fraudulent activity report of each iteration for steps (O) through (R); and modifying the policy guideline in accordance to the new fraudulent-activity trend with the third-party server.

* * * * *